(12) United States Patent
Li et al.

(10) Patent No.: US 10,680,781 B2
(45) Date of Patent: Jun. 9, 2020

(54) ACKNOWLEDGEMENT INFORMATION SENDING AND RECEIVING METHODS, RECEIVING DEVICE, AND SENDING DEVICE

(71) Applicant: HUAWEI TECHNOLOGIES CO., LTD., Shenzhen, Guangdong (CN)

(72) Inventors: Chaojun Li, Beijing (CN); Xiaobo Chen, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 209 days.

(21) Appl. No.: 15/880,645

(22) Filed: Jan. 26, 2018

(65) Prior Publication Data
US 2018/0152274 A1    May 31, 2018

Related U.S. Application Data

(63) Continuation-in-part of application No. PCT/CN2015/085208, filed on Jul. 27, 2015.

(51) Int. Cl.
*H04W 72/00* (2009.01)
*H04L 5/00* (2006.01)
(Continued)

(52) U.S. Cl.
CPC .......... *H04L 5/0055* (2013.01); *H04L 1/1854* (2013.01); *H04L 1/1861* (2013.01); *H04W 28/04* (2013.01)

(58) Field of Classification Search
None
See application file for complete search history.

(56) References Cited

U.S. PATENT DOCUMENTS 7,813,261 B2 * 10/2010 Ma ...................... H04L 27/2602
                                                                  370/203
2009/0190516 A1 * 7/2009 Fukuoka ............. H04L 27/2613
                                                                  370/312
(Continued)

FOREIGN PATENT DOCUMENTS

CN       101771939 A       7/2010
CN       101777971 A       7/2010
(Continued)

OTHER PUBLICATIONS

Extended European Search Report issued in European Application No. 15899188.5 dated Jun. 28, 2018, 6 pages.
(Continued)

*Primary Examiner* — Ayanah S George
(74) *Attorney, Agent, or Firm* — Fish & Richardson P.C.

(57) ABSTRACT

The present disclosure provides example acknowledgement information sending and receiving methods, as well as example sending and receiving devices, so that the receiving device synchronously feeds back a receiving status of unicast data and a receiving status of multicast data to the sending device. One example method includes receiving unicast data and multicast data sent by a sending device in a same subframe. A feedback resource is determined according to a data receiving status and a resource mapping relationship, where the data receiving status includes a receiving status of the unicast data and a receiving status of the multicast data, and where the resource mapping relationship indicates a mapping relationship between the data receiving status and the feedback resource. Acknowledgement information is then sent to the sending device by using the determined feedback resource to notify the sending device of the receiving status of the unicast data and the receiving status of the multicast data.

20 Claims, 8 Drawing Sheets

(51) Int. Cl.
*H04L 1/18* (2006.01)
*H04W 28/04* (2009.01)

(56) References Cited

U.S. PATENT DOCUMENTS

| | | |
|---|---|---|
| 2013/0315124 A1 | 11/2013 | Rapaport et al. |
| 2015/0117272 A1* | 4/2015 | Gao .................... H04L 1/1861 370/280 |
| 2015/0181574 A1 | 6/2015 | Lee et al. |
| 2015/0358986 A1 | 12/2015 | Yang et al. |
| 2016/0007324 A1 | 1/2016 | Lee et al. |

FOREIGN PATENT DOCUMENTS

| | | |
|---|---|---|
| CN | 101882982 A | 11/2010 |
| CN | 102111254 A | 6/2011 |
| CN | 103384188 A | 11/2013 |
| CN | 104584460 A | 4/2015 |
| WO | 2010027167 A2 | 3/2010 |
| WO | 2011113200 A1 | 9/2011 |
| WO | 2014123379 A1 | 8/2014 |
| WO | 2014148796 A1 | 9/2014 |

OTHER PUBLICATIONS

Chinese Office Action issued in Chinese Application No. 201580028285 dated Jan. 31, 2019, 13 pages.
International Search Report and Written Opinion in International Application No. PCT/CN2015/085208, dated Apr. 28, 2016, 19 pages.

* cited by examiner

US 10,680,781 B2

ACKNOWLEDGEMENT INFORMATION SENDING AND RECEIVING METHODS, RECEIVING DEVICE, AND SENDING DEVICE

CROSS-REFERENCE TO RELATED APPLICATIONS

This application is a continuation of International Application No. PCT/CN2015/085208, filed on Jul. 27, 2015, the disclosure of which is hereby incorporated by reference in its entirety.

TECHNICAL FIELD

The present invention relates to the communications field, and in particular, to acknowledgement information sending and receiving methods, a data receiving status indication method, a receiving device, a sending device, and a communications system.

BACKGROUND

Single cell point to multipoint (SC-PTM) transmission is transmission of a multicast service on a physical downlink shared channel (PDSCH). Evolved multimedia broadcast/multicast service (eMBMS) transmission and unicast transmission cannot reuse a resource in a same subframe, and subframe configuration in a multicast-broadcast single-frequency network (MBSFN) region to which eMBMS transmission is applied cannot be dynamically adjusted. Consequently, a resource allocated for eMBMS transmission is wasted. An SC-PTM transmission technology can reduce resource waste occurred in eMBMS transmission, and improve spectral efficiency.

Different from a PDSCH that carries unicast data, a PDSCH that carries multicast data in an SC-PTM transmission process is referred to as a multicast PDSCH. In the SC-PTM transmission process, a base station sends a physical downlink control channel (PDCCH) to a group of user equipments (UE) in a cell. The group of UEs obtain scheduling information of the multicast PDSCH by receiving the PDCCH, then receives the multicast PDSCH according to the scheduling information, and further obtains the multicast data carried on the multicast PDSCH.

Similar to unicast transmission, SC-PTM transmission also supports a hybrid automatic repeat request (HARQ) technology. A base station sends, in a downlink subframe to a group of UEs, a multicast PDSCH that carries multicast data. Some or all UEs in the UE group send, in an uplink subframe to the base station, hybrid automatic repeat request-acknowledgement (HARQ-ACK) information used to feed back the multicast PDSCH. When the UEs successfully receive the multicast PDSCH, the UEs feed back an acknowledgement ACK to the base station. When the UEs fail to receive the multicast PDSCH, the UEs feed back a negative acknowledgement (NACK) to the base station. After receiving the HARQ-ACK feedback information, the base station learns of a multicast data receiving status of the UEs according to the HARQ-ACK feedback information, and then determines whether the multicast PDSCH that carries the multicast data needs to be retransmitted to the UEs.

UE that supports SC-PTM transmission can simultaneously receive, in a same subframe, one unicast transmission and N multicast PDSCH transmissions sent by a base station, and N is a positive integer. Therefore, the UE needs to feed back, to the base station, multiple pieces of HARQ-ACK feedback information specific to the multiple transmissions. However, it is not defined in an existing HARQ feedback mechanism that UE feeds back multiple pieces of HARQ-ACK feedback information (including multicast HARQ-ACK feedback) to a base station.

SUMMARY

Embodiments of the present invention provide acknowledgement information sending and receiving methods, a data receiving status indication method, a receiving device, a sending device, and a communications system, so that the receiving device synchronously feeds back a receiving status of unicast data and a receiving status of multicast data to the sending device.

According to a first aspect, an embodiment of the present invention provides an acknowledgement information sending method, including:

receiving, by a receiving device, unicast data and multicast data sent by a sending device in a same subframe;

determining, by the receiving device, a feedback resource according to a data receiving status and a resource mapping relationship, where the data receiving status includes a receiving status of the unicast data and a receiving status of the multicast data, and the resource mapping relationship is used to indicate a mapping relationship between the data receiving status and the feedback resource; and sending, by the receiving device, acknowledgement information to the sending device by using the feedback resource, to notify the sending device of the receiving status of the unicast data and the receiving status of the multicast data.

For example, the receiving device may be user equipment or a terminal.

For example, the sending device may be a base station.

With reference to the first aspect, in a first possible implementation, the method further includes:

determining, by the receiving device, the acknowledgement information according to the data receiving status and an acknowledgement mapping relationship, where the acknowledgement mapping relationship is used to indicate a mapping relationship between the data receiving status and the acknowledgement information.

With reference to the first aspect or the first possible implementation of the first aspect, in a second possible implementation of the first aspect, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

With reference to the first aspect or the first possible implementation of the first aspect, in a third possible implementation of the first aspect, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

With reference to the third possible implementation of the first aspect, in a fourth possible implementation of the first aspect, the multicast feedback resource is a multicast physical uplink control channel (PUCCH) resource, and the multicast PUCCH resource meets the following condition:

$$n_{PUCCH} = n_{CCE} + N_{PUCCH}^{(1)} + F(n_{RNTI}), \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and $F(n_{RNTI}) = n_{RNTI}$ mod L, where $n_{RNTI}$ represents a radio network temporary identifier, and L represents a CCE aggregation level.

With reference to the third possible implementation of the first aspect, in a fifth possible implementation of the first aspect, the multicast feedback resource is a multicast physical uplink control channel PUCCH resource, and the multicast PUCCH resource meets the following condition:

$$n_{PUCCH} = n_{CCE} + N_{PUCCH}^{(1)} + k, \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and a value range of k is [0, L−1], where L represents a CCE aggregation level.

With reference to the first aspect, in a sixth possible implementation, when the unicast data is unicast physical downlink shared channel PDSCH data, the receiving status of the unicast data includes a data receiving status of each transport block in the unicast PDSCH data.

With reference to the first aspect or the sixth possible implementation of the first aspect, in a seventh possible implementation of the first aspect, the receiving status of the multicast data is a logical AND operation result of receiving statuses of N pieces of multicast data, and a receiving status of each piece of multicast data is a logical AND operation result of data receiving statuses of all transport blocks in the multicast data.

According to a second aspect, an embodiment of the present invention provides an acknowledgement information receiving method, including:

sending, by a sending device, unicast data and multicast data to a receiving device in a same subframe;

receiving, by the sending device, acknowledgement information sent by the receiving device by using a feedback resource; and determining, by the sending device, a data receiving status of the receiving device according to the feedback resource, the acknowledgement information, a resource mapping relationship, and an acknowledgement mapping relationship, where the resource mapping relationship is used to indicate a mapping relationship between the feedback resource and the data receiving status, the acknowledgement mapping relationship is used to indicate a mapping relationship between the acknowledgement information and the data receiving status, and the data receiving status includes a receiving status of the unicast data and a receiving status of the multicast data.

For example, the sending device may be a base station, and the receiving device may be user equipment or a terminal.

With reference to the second aspect, in a first possible implementation, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

With reference to the second aspect, in a second possible implementation, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

With reference to the second aspect, in a third possible implementation, before the receiving, by the sending device, acknowledgement information sent by the receiving device by using a feedback resource, the method further includes:

determining, by the sending device, a feedback resource that may be used by the receiving device to send the acknowledgement information, where the feedback resource includes a unicast feedback resource corresponding to the unicast data and a multicast feedback resource corresponding to the multicast data; and performing, by the sending device, monitoring on the feedback resource that may be used by the receiving device to send the acknowledgement information, to receive the acknowledgement information sent by the receiving device.

With reference to the third possible implementation of the second aspect, in a fourth possible implementation of the second aspect, the multicast feedback resource is a multicast physical uplink control channel PUCCH resource, and the multicast PUCCH resource meets the following condition:

$$n_{PUCCH}^{(p0)} = n_{CCE} + N_{PUCCH}^{(1)} + F(n_{RNTI}), \text{ where}$$

$n_{PUCCH}$ represents the multicast PUCCH resource, $n_{CCE}$ represents a number of the first control channel element CCE occupied by a multicast PDCCH resource, $n_{PUCCH}^{(1)}$ represents an offset that is of a multicast PUCCH resource region and that is configured by using higher layer signaling, and $F(n_{RNTI}) = n_{RNTI}$ mod L, where $n_{RNTI}$ represents a radio network temporary identifier, and L represents a CCE aggregation level.

With reference to the third possible implementation of the second aspect, in a fifth possible implementation of the second aspect, the multicast feedback resource is a multicast physical uplink control channel PUCCH resource, and the multicast PUCCH resource meets the following condition:

$$n_{PUCCH}^{(p0)} = n_{CCE} + N_{PUCCH}^{(1)} + k, \text{ where}$$

$n_{PUCCH}$ represents the multicast PUCCH resource, $n_{CCE}$ represents a number of the first control channel element CCE occupied by a multicast PDCCH resource, $n_{PUCCH}^{(1)}$ represents an offset that is of a multicast PUCCH resource region and that is configured by using higher layer signaling, and a value range of k is [0, L−1], where L represents a CCE aggregation level.

With reference to the second aspect, in a sixth possible implementation, when the unicast data is unicast physical downlink shared channel PDSCH data, the receiving status of the unicast data includes a data receiving status of each transport block in the unicast PDSCH data.

With reference to the second aspect or the sixth possible implementation of the second aspect, in a seventh possible implementation of the second aspect, the receiving status of the multicast data is a logical AND operation result of receiving statuses of N pieces of multicast data, and a receiving status of each piece of multicast data is a logical AND operation result of data receiving statuses of all transport blocks in the multicast data.

According to a third aspect, an embodiment of the present invention provides a receiving device, including:

a data receiving module, configured to receive unicast data and multicast data sent by a sending device in a same subframe;

a resource determining module, configured to determine a feedback resource according to a data receiving status of the data receiving module and a resource mapping relationship, where the data receiving status includes a receiving status of the unicast data and a receiving status of the multicast data, and the resource mapping relationship is used to indicate a mapping relationship between the data receiving status and the feedback resource; and an acknowledgement sending module, configured to send acknowledgement information to the sending device by using the feedback resource determined by the resource determining module, to notify the sending device of the receiving status of the unicast data and the receiving status of the multicast data.

With reference to the third aspect, in a first possible implementation, the receiving device further includes:

an acknowledgement determining module, configured to determine the acknowledgement information according to the data receiving status of the data receiving module and an acknowledgement mapping relationship, where the acknowledgement mapping relationship is used to indicate a mapping relationship between the data receiving status and the acknowledgement information.

With reference to the third aspect or the first possible implementation of the third aspect, in a second possible implementation of the third aspect, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

With reference to the third aspect or the first possible implementation of the third aspect, in a third possible implementation of the third aspect, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

With reference to the third possible implementation of the third aspect, in a fourth possible implementation of the third aspect, the multicast feedback resource is a multicast physical uplink control channel PUCCH resource, and the multicast PUCCH resource meets the following condition:

$$n_{PUCCH}=n_{CCE}+N_{PUCCH}^{(1)}+F(n_{RNTI}), \text{ where}$$

$n_{PUCCH}$ represents the multicast PUCCH resource, $n_{CCE}$ represents a number of the first control channel element CCE occupied by a multicast PDCCH resource, $n_{PUCCH}^{(1)}$ represents an offset that is of a multicast PUCCH resource region and that is configured by using higher layer signaling, and $F(n_{RNTI})=n_{RNTI} \bmod L$, where $n_{RNTI}$ represents a radio network temporary identifier, and L represents a CCE aggregation level.

With reference to the third possible implementation of the third aspect, in a fifth possible implementation of the third aspect, the multicast feedback resource is a multicast physical uplink control channel PUCCH resource, and the multicast PUCCH resource meets the following condition:

$$n_{PUCCH}+n_{CCE}+N_{PUCCH}^{(1)}+k, \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and a value range of k is [0, L−1], where L represents a CCE aggregation level.

With reference to the third aspect, in a sixth possible implementation, when the unicast data is unicast physical downlink shared channel PDSCH data, the receiving status of the unicast data includes a data receiving status of each transport block in the unicast PDSCH data.

With reference to the third aspect or the sixth possible implementation of the third aspect, in a seventh possible implementation of the third aspect, the receiving status of the multicast data is a logical AND operation result of receiving statuses of N pieces of multicast data, and a receiving status of each piece of multicast data is a logical AND operation result of data receiving statuses of all transport blocks in the multicast data.

According to a fourth aspect, an embodiment of the present invention provides a sending device, including:

a data sending module, configured to send unicast data and multicast data to a receiving device in a same subframe;

an acknowledgement receiving module, configured to receive acknowledgement information sent by the receiving device by using a feedback resource; and a data receiving status determining module, configured to determine a data receiving status of the receiving device according to the feedback resource by using which the acknowledgement receiving module receives the acknowledgement information, the acknowledgement information received by the acknowledgement receiving module, a resource mapping relationship, and an acknowledgement mapping relationship, where the resource mapping relationship is used to indicate a mapping relationship between the feedback resource and the data receiving status, the acknowledgement mapping relationship is used to indicate a mapping relationship between the acknowledgement information and the data receiving status, and the data receiving status includes a receiving status of the unicast data and a receiving status of the multicast data.

With reference to the fourth aspect, in a first possible implementation, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

With reference to the fourth aspect, in a second possible implementation, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

With reference to the fourth aspect, in a third possible implementation, the sending device further includes:

a resource determining module, configured to determine a feedback resource that may be used by the receiving device to send the acknowledgement information, where the feedback resource includes a unicast feedback resource corresponding to the unicast data and a multicast feedback resource corresponding to the multicast data, where the acknowledgement receiving module is further configured to perform monitoring on the feedback resource that is determined by the resource determining module and that may be used by the receiving device to send the acknowledgement information, to receive the acknowledgement information sent by the receiving device.

With reference to the third possible implementation of the fourth aspect, in a fourth possible implementation of the fourth aspect, the multicast feedback resource is a multicast physical uplink control channel PUCCH resource, and the multicast PUCCH resource meets the following condition:

$$n_{PUCCH}^{(p0)} = n_{CCE} + N_{PUCCH}^{(1)} + F(n_{RNTI}), \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and $F(n_{RNTI}) = n_{RNTI} \mod L$, where $n_{RNTI}$ represents a radio network temporary identifier, and L represents a CCE aggregation level.

With reference to the third possible implementation of the fourth aspect, in a fifth possible implementation of the fourth aspect, the multicast feedback resource is a multicast physical uplink control channel PUCCH resource, and the multicast PUCCH resource meets the following condition:

$$n_{PUCCH}^{(p0)} + n_{CCE} + N_{PUCCH}^{(1)} + k, \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and a value range of k is [0, L−1], where L represents a CCE aggregation level.

With reference to the fourth aspect, in a sixth possible implementation, when the unicast data is unicast physical downlink shared channel PDSCH data, the receiving status of the unicast data includes a data receiving status of each transport block in the unicast PDSCH data.

With reference to the fourth aspect or the sixth possible implementation of the fourth aspect, in a seventh possible implementation of the fourth aspect, the receiving status of the multicast data is a logical AND operation result of receiving statuses of N pieces of multicast data, and a receiving status of each piece of multicast data is a logical AND operation result of data receiving statuses of all transport blocks in the multicast data.

According to a fifth aspect, an embodiment of the present invention provides a receiving device, including:

a transceiver, configured to receive unicast data and multicast data sent by a sending device in a same subframe; and a processor, configured to determine a feedback resource according to a data receiving status of the transceiver and a resource mapping relationship, where the data receiving status includes a receiving status of the unicast data and a receiving status of the multicast data, and the resource mapping relationship is used to indicate a mapping relationship between the data receiving status and the feedback resource, where the transceiver is further configured to send acknowledgement information to the sending device by using the feedback resource determined by the processor, to notify the sending device of the receiving status of the unicast data and the receiving status of the multicast data.

With reference to the fifth aspect, in a first possible implementation, the processor is further configured to:

determine the acknowledgement information according to the data receiving status of the transceiver and an acknowledgement mapping relationship, where the acknowledgement mapping relationship is used to indicate a mapping relationship between the data receiving status and the acknowledgement information.

With reference to the fifth aspect or the first possible implementation of the fifth aspect, in a second possible implementation of the fifth aspect, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

With reference to the fifth aspect or the first possible implementation of the fifth aspect, in a third possible implementation of the fifth aspect, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

With reference to the third possible implementation of the fifth aspect, in a fourth possible implementation of the fifth aspect, the multicast feedback resource is a multicast physical uplink control channel PUCCH resource, and the multicast PUCCH resource meets the following condition:

$$n_{PUCCH} = n_{CCE} + N_{PUCCH}^{(1)} + F(n_{RNTI}), \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and $F(n_{RNTI}) = n_{RNTI} \bmod L$, where $n_{RNTI}$ represents a radio network temporary identifier, and L represents a CCE aggregation level.

With reference to the third possible implementation of the fifth aspect, in a fifth possible implementation of the fifth aspect, the multicast feedback resource is a multicast physical uplink control channel PUCCH resource, and the multicast PUCCH resource meets the following condition:

$$n_{PUCCH} = n_{CCE} + N_{PUCCH}^{(1)} + k, \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and a value range of k is [0, L−1], where L represents a CCE aggregation level.

With reference to the fifth aspect, in a sixth possible implementation, when the unicast data is unicast physical downlink shared channel PDSCH data, the receiving status of the unicast data includes a data receiving status of each transport block in the unicast PDSCH data.

With reference to the fifth aspect or the sixth possible implementation of the fifth aspect, in a seventh possible implementation of the fifth aspect, the receiving status of the multicast data is a logical AND operation result of receiving statuses of N pieces of multicast data, and a receiving status of each piece of multicast data is a logical AND operation result of data receiving statuses of all transport blocks in the multicast data.

According to a sixth aspect, an embodiment of the present invention provides a sending device, including:

a transceiver, configured to send unicast data and multicast data to a receiving device in a same subframe, and receive acknowledgement information sent by the receiving device by using a feedback resource; and a processor, configured to determine a data receiving status of the receiving device according to the feedback resource by using which the transceiver receives the acknowledgement information, the acknowledgement information received by the transceiver, a resource mapping relationship, and an acknowledgement mapping relationship, where the resource mapping relationship is used to indicate a mapping relationship between the feedback resource and the data receiving status, the acknowledgement mapping relationship is used to indicate a mapping relationship between the acknowledgement information and the data receiving status, and the data receiving status includes a receiving status of the unicast data and a receiving status of the multicast data.

With reference to the sixth aspect, in a first possible implementation, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

With reference to the sixth aspect, in a second possible implementation, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

With reference to the sixth aspect, in a third possible implementation, the processor is further configured to:

determine a feedback resource that may be used by the receiving device to send the acknowledgement information, where the feedback resource includes a unicast feedback resource corresponding to the unicast data and a multicast feedback resource corresponding to the multicast data; and the transceiver is further configured to perform monitoring on the feedback resource that is determined by the processor and that may be used by the receiving device to send the acknowledgement information, to receive the acknowledgement information sent by the receiving device.

With reference to the third possible implementation of the sixth aspect, in a fourth possible implementation of the sixth aspect, the multicast feedback resource is a multicast physical uplink control channel PUCCH resource, and the multicast PUCCH resource meets the following condition:

$$n_{PUCCH}^{(p0)} = n_{CCE} + N_{PUCCH}^{(1)} + F(n_{RNTI}), \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and $F(n_{RNTI}) = n_{RNTI} \bmod L$, where $n_{RNTI}$ represents a radio network temporary identifier, and L represents a CCE aggregation level.

With reference to the third possible implementation of the sixth aspect, in a fifth possible implementation of the sixth aspect, the multicast feedback resource is a multicast physical uplink control channel PUCCH resource, and the multicast PUCCH resource meets the following condition:

$$n_{PUCCH}^{(p0)} = n_{CCE} + N_{PUCCH}^{(1)} + k, \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and a value range of k is [0, L−1], where L represents a CCE aggregation level.

With reference to the sixth aspect, in a sixth possible implementation, when the unicast data is unicast physical downlink shared channel PDSCH data, the receiving status of the unicast data includes a data receiving status of each transport block in the unicast PDSCH data.

With reference to the sixth aspect or the sixth possible implementation of the sixth aspect, in a seventh possible implementation of the sixth aspect, the receiving status of the multicast data is a logical AND operation result of receiving statuses of N pieces of multicast data, and a receiving status of each piece of multicast data is a logical AND operation result of data receiving statuses of all transport blocks in the multicast data.

According to a seventh aspect, an embodiment of the present invention provides a communications system, including a receiving device and a sending device, where the receiving device includes the apparatus according to the third aspect; and the sending device includes the apparatus according to the fourth aspect.

According to an eighth aspect, an embodiment of the present invention provides a data receiving status indication method, including:

receiving, by a receiving device, unicast data and multicast data sent by a sending device in a same subframe; and determining, by the receiving device according to a data receiving status and a mapping relationship, not to send acknowledgement information to the sending device, to indicate to the sending device that data receiving statuses of all transport blocks in the unicast data are discontinuous transmission DTX, and that data of the multicast data is successfully received or a receiving status of the multicast data is discontinuous transmission DTX, where the data receiving status includes a receiving status of the unicast data and the receiving status of the multicast data, and the mapping relationship is used to indicate a mapping relationship between the data receiving status and an operation that the receiving device does not send acknowledgement information to the sending device.

With reference to the eighth aspect, in a first possible implementation, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

According to a ninth aspect, an embodiment of the present invention provides a data receiving status indication method, including:

sending, by a sending device, unicast data and multicast data to a receiving device in a same subframe; and when the sending device detects no acknowledgement information sent by the receiving device, determining, by the sending device according to a mapping relationship, that data receiving statuses of all transport blocks in the unicast data are discontinuous transmission DTX, and that data of the multicast data is successfully received or a receiving status of the multicast data is discontinuous transmission DTX, where the mapping relationship is used to indicate a mapping relationship between a data receiving status and an operation that the receiving device does not send acknowledgement information to the sending device, and the data receiving status includes a receiving status of the unicast data and the receiving status of the multicast data.

With reference to the ninth aspect, in a first possible implementation, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

According to a tenth aspect, an embodiment of the present invention provides a receiving device, including:

a data receiving module, configured to receive unicast data and multicast data sent by a sending device in a same subframe; and an acknowledgement processing module, configured to determine, according to a data receiving status of the data receiving module and a mapping relationship, not to send acknowledgement information to the sending device, to indicate to the sending device that data receiving statuses of all transport blocks in the unicast data are discontinuous transmission DTX, and that data of the multicast data is successfully received or a receiving status of the multicast data is discontinuous transmission DTX, where the data receiving status includes a receiving status of the unicast data and the receiving status of the multicast data, and the mapping relationship is used to indicate a mapping relationship between the data receiving status and an operation that the receiving device does not send acknowledgement information to the sending device.

With reference to the tenth aspect, in a first possible implementation, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

According to an eleventh aspect, an embodiment of the present invention provides a sending device, including:

a data sending module, configured to send unicast data and multicast data to a receiving device in a same subframe; and a data receiving status determining module, configured to: when no acknowledgement information sent by the receiving device is detected, determine, according to a mapping relationship, that data receiving statuses of all transport blocks in the unicast data are discontinuous transmission DTX, and that data of the multicast data is successfully received or a receiving status of the multicast data is discontinuous transmission DTX, where the mapping relationship is used to indicate a mapping relationship between a data receiving status and an operation that the receiving device does not send acknowledgement information to the sending device, and the data receiving status includes a receiving status of the unicast data and the receiving status of the multicast data.

With reference to the eleventh aspect, in a first possible implementation, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

According to a twelfth aspect, an embodiment of the present invention provides a receiving device, including:

a transceiver, configured to receive unicast data and multicast data sent by a sending device in a same subframe; and a processor, configured to determine, according to a data receiving status of the transceiver and a mapping relationship, not to send acknowledgement information to the sending device, to indicate to the sending device that data receiving statuses of all transport blocks in the unicast data are discontinuous transmission DTX, and that data of the multicast data is successfully received or a receiving status of the multicast data is discontinuous transmission DTX, where the data receiving status includes a receiving status of the unicast data and the receiving status of the multicast data, and the mapping relationship is used to indicate a mapping relationship between the data receiving status and an operation that the receiving device does not send acknowledgement information to the sending device.

With reference to the twelfth aspect, in a first possible implementation, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

According to a thirteenth aspect, an embodiment of the present invention provides a sending device, including:

a transceiver, configured to send unicast data and multicast data to a receiving device in a same subframe; and a processor, configured to: when no acknowledgement information sent by the receiving device is detected, determine, according to a mapping relationship, that data receiving statuses of all transport blocks in the unicast data are discontinuous transmission DTX, and that data of the multicast data is successfully received or a receiving status of the multicast data is discontinuous transmission DTX, where the mapping relationship is used to indicate a mapping relationship between a data receiving status and an operation that the receiving device does not send acknowledgement information to the sending device, and the data receiving status includes a receiving status of the unicast data and the receiving status of the multicast data.

With reference to the thirteenth aspect, in a first possible implementation, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

According to a fourteenth aspect, an embodiment of the present invention provides a communications system, including a receiving device and a sending device, where the receiving device includes the apparatus according to the tenth aspect; and the sending device includes the apparatus according to the eleventh aspect.

In the embodiments of the present invention, after a receiving device receives unicast data and multicast data sent by a sending device in a same subframe, the receiving device indicates a data receiving status to the sending device in either of two manners: sending acknowledgement information to the sending device by using a selected feedback resource and not sending acknowledgement information to the sending device. When the receiving device indicates the data receiving status to the sending device by sending acknowledgement information to the sending device by using the selected feedback resource, the feedback resource and the acknowledgement information jointly indicate a receiving status of the unicast data and a receiving status of the multicast data. The sending device may determine, according to the data receiving status of the receiving device, whether the unicast data and/or the multicast data need/needs to be retransmitted to the receiving device. Therefore, by using the technical solutions provided in the embodiments of the present invention, the receiving device can synchronously feed back the receiving status of the unicast data and the receiving status of the multicast data to the sending device.

DESCRIPTION OF EMBODIMENTS

Figure 1:
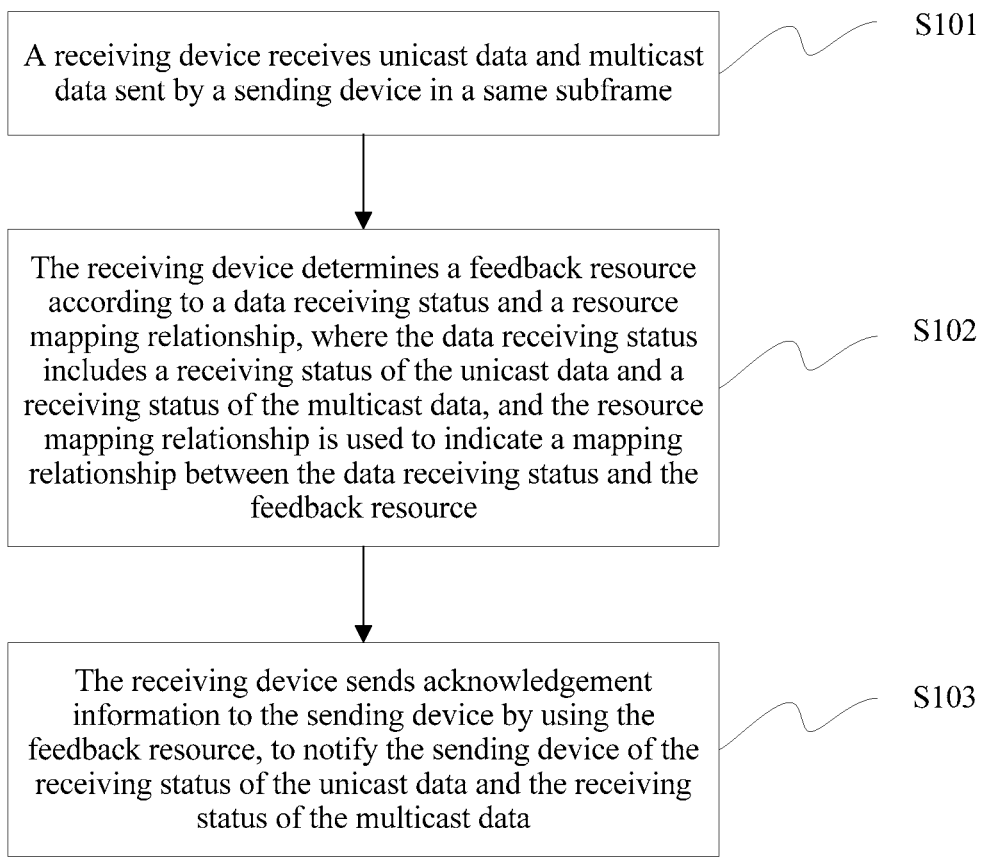
FIG. 1 is a schematic flowchart of an acknowledgement information sending method according to an embodiment of the present invention.

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Technical solutions of the present invention relate to unicast transmission and SC-PTM transmission. SC-PTM transmission is transmission of a multicast service on a PDSCH. Multicast transmission in the technical solutions of the present invention is SC-PTM transmission. An SC-PTM transmission technology can reduce resource waste occurred in eMBMS transmission, and improve spectral efficiency. Unicast transmission and multicast transmission both support an HARQ technology. The HARQ technology means that after a receiving device receives data sent by a sending device, the receiving device feeds back, to the sending device, HARQ-ACK feedback information used to indicate a data receiving status of the receiving device. The sending device determines, according to the HARQ-ACK feedback information fed back by the receiving device, whether the data needs to be retransmitted to the receiving device.

In the embodiments of the present invention, the receiving device and the sending device may be any device having data transmission and receiving functions. Optionally, the receiving device may be UE, and the sending device may be a base station. In the embodiments of the present invention, acknowledgement information is used to indicate the data receiving status of the receiving device, and may be the HARQ-ACK feedback information.

In the embodiments of the present invention, after the sending device sends unicast data and multicast data to the receiving device in a same subframe, the receiving device indicates the data receiving status of the receiving device to the sending device by using either of two technical solutions. The data receiving status includes a receiving status of the unicast data and a receiving status of the multicast data. In one technical solution, the receiving device sends acknowledgement information to the sending device by using a selected feedback resource. The feedback resource and the acknowledgement information jointly indicate the data receiving status of the receiving device. Therefore, the sending device may learn of the data receiving status of the receiving device according to the feedback resource and the acknowledgement information, and then determine whether the unicast data and/or the multicast data need/needs to be retransmitted need/needs to be retransmitted to the receiving device. In the other technical solution, the receiving device determines, according to the data receiving status, not to feed back acknowledgement information to the sending device, to indicate the data receiving status to the sending device. Therefore, when the sending device detects no acknowledgement information fed back by the receiving device, the sending device can learn of the data receiving status of the receiving device, and then determine whether the unicast data and/or the multicast data need/needs to be retransmitted to the receiving device. Therefore, by using the technical solutions provided in the embodiments of the present invention, the receiving device can synchronously feed back the receiving status of the unicast data and the receiving status of the multicast data to the sending device.

Embodiment 1

As shown in FIG. 1, an embodiment of the present invention provides an acknowledgement information sending method, and the method includes the following steps.

S101: A receiving device receives unicast data and multicast data sent by a sending device in a same subframe.

S102: The receiving device determines a feedback resource according to a data receiving status and a resource mapping relationship, where the data receiving status includes a receiving status of the unicast data and a receiving status of the multicast data, and the resource mapping relationship is used to indicate a mapping relationship between the data receiving status and the feedback resource.

S103: The receiving device sends acknowledgement information to the sending device by using the feedback resource, to notify the sending device of the receiving status of the unicast data and the receiving status of the multicast data.

In this embodiment, before the receiving device selects the feedback resource according to the data receiving status and the resource mapping relationship, the receiving device receives a unicast PDCCH and a multicast PDCCH sent by the sending device. The unicast PDCCH carries scheduling information transmitted on a unicast PDSCH or SPS release signaling. The multicast PDCCH carries scheduling information transmitted on a multicast PDSCH. The receiving device receives, according to an indication of the scheduling information on the unicast PDCCH and an indication of the scheduling information carried on the multicast PDCCH, unicast PDSCH data and multicast PDSCH data sent by the sending device. Alternatively, the receiving device receives, according to the SPS release signaling carried on the unicast PDCCH and an indication of the scheduling information carried on the multicast PDCCH, the SPS release signaling and multicast PDSCH data sent by the sending device.

In this embodiment, a PDCCH includes a PDCCH defined in Rel-8/9/10, an enhanced PDCCH (ePDCCH) defined after Rel-10, and a possible evolved PDCCH in the future. The PDCCH and a PDSCH defined in Rel-8/9/10 are based on time division. A new PDCCH region is introduced in a Long Term Evolution (LTE) system after Rel-10. A PDCCH and a PDSCH in this region are based on frequency division. A PDCCH defined after Rel-10 is an ePDCCH.

Optionally, the receiving device receives one piece of unicast data and N pieces of multicast data sent by the sending device in the same subframe, and N is a positive integer. Further, the one piece of unicast data and the N pieces of multicast data are carried on a same carrier.

In this embodiment, after receiving the unicast data and the multicast data, the receiving device separately determines the receiving status of the unicast data and the receiving status of the multicast data. The data receiving status includes acknowledgement (ACK), negative acknowledgement NACK, and discontinuous transmission (DTX).

The unicast data is unicast PDSCH data or downlink semi-persistent scheduling (SPS) release signaling. The multicast data is multicast PDSCH data. For the unicast PDSCH data or the multicast PDSCH data, ACK represents that the data is successfully received, NACK represents that the data fails to be received, and DTX represents that no PDSCH data is received. If the unicast data is SPS release signaling, when the receiving device detects a PDCCH that is sent by the sending device and that carries the SPS release signaling, a data receiving status of the SPS release signaling is ACK; otherwise, a data receiving status of the SPS release signaling is DTX.

The unicast data corresponds to one or two data receiving statuses. In a process of determining the receiving status of the unicast data, when the unicast data is SPS release signaling, a data receiving status of the SPS release signaling is ACK or DTX. When the unicast data is unicast PDSCH data, the receiving status of the unicast data includes a data receiving status of each transport block (TB) in the unicast PDSCH data. That is, when unicast PDSCH transmission supports one TB, the receiving status of the unicast data includes a data receiving status of the one TB; or when unicast PDSCH transmission supports two TBs, the receiving status of the unicast data includes data receiving statuses respectively corresponding to the two TBs.

The multicast data corresponds to one data receiving status. The receiving status of the multicast data is information obtained after data receiving statuses of N pieces of multicast data are processed. Optionally, the receiving status of the multicast data is a logical AND operation result of the data receiving statuses of the N pieces of multicast data, and a data receiving status of each piece of multicast data is a logical AND operation result of data receiving statuses of all transport blocks TBs in the multicast data. Multicast transmission is multicast PDSCH transmission, and multicast PDSCH transmission supports one TB or two TBs.

In this embodiment, after determining the data receiving status, the receiving device determines, according to the data receiving status and the resource mapping relationship, the feedback resource for sending the acknowledgement information. The resource mapping relationship is used to indicate the mapping relationship between the data receiving status and the feedback resource.

The resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data; or the second relationship is used to indicate that when data of at least one transport block in the unicast data fails to be received, and data of the multicast data is successfully received or the receiving status of the multicast data is discontinuous transmission DTX, the feedback resource is a unicast feedback resource corresponding to the unicast data; and/or a third relationship, where the third relationship is used to indicate that when a data receiving status of a transport block in the unicast data does not include successfully received, and data of the multicast data fails to be received, the feedback resource is a multicast feedback resource corresponding to the multicast data; or further, the third relationship is used to indicate that when data of all transport blocks in the unicast data fails to be received, and data of the multicast data fails to be received, the feedback resource is a multicast feedback resource corresponding to the multicast data.

For example, if the unicast data includes data of only one transport block, and the data receiving status is represented in a form of (X, Y), where X represents a data receiving status of the transport block in the unicast data, and Y represents the receiving status of the multicast data, the first relationship is used to indicate that when the data receiving status is (ACK, ACK/NACK/DTX), the feedback resource is the unicast feedback resource corresponding to the unicast data; the second relationship is used to indicate that when the data receiving status is (NACK, ACK/DTX), the feedback resource is the unicast feedback resource corresponding to the unicast data; and the third relationship is used to indicate that when the data receiving status is (NACK/DTX, NACK), the feedback resource is the multicast feedback resource corresponding to the multicast data.

For example, if the unicast data includes data of two transport blocks, and the data receiving status is represented in a form of (X1, X2, Y), where X1 and X2 respectively represent data receiving statuses of the two transport blocks in the unicast data, and Y represents the receiving status of the multicast data, the first relationship is used to indicate that when the data receiving status is (ACK, ACK, ACK/NACK/DTX) or (ACK, NACK/DTX, ACK/NACK/DTX), the feedback resource is the unicast feedback resource corresponding to the unicast data; the second relationship is used to indicate that when the data receiving status is (NACK, NACK, ACK/DTX), the feedback resource is the unicast feedback resource corresponding to the unicast data; and the third relationship is used to indicate that when the data receiving status is (NACK/DTX, NACK/DTX, NACK), the feedback resource is the multicast feedback resource corresponding to the multicast data.

If the receiving device selects, according to the resource mapping relationship, the unicast feedback resource corresponding to the unicast data as the feedback resource, the unicast feedback resource is a unicast PUCCH resource. The unicast PUCCH resource meets the following formula 1:

$$n_{PUCCH} = n_{CCE} + N_{PUCCH}^{(1)} + a \quad \text{Formula 1}$$

In the formula 1, $n_{PUCCH}$ represents the unicast PUCCH resource; $n_{CCE}$ represents a number of the first control channel element (CCE) occupied by a unicast PDCCH resource, where the unicast PDCCH resource is used to carry scheduling information transmitted on a unicast PDSCH or SPS release signaling; and $N_{PUCCH}^{(1)}$ represents an offset that is of a unicast PUCCH resource region and that is configured by using higher layer signaling. For example, when one antenna is used for transmission, a corresponding to a unicast PUCCH resource on an antenna port $p_0$ is equal to 0. When two antennas are used for transmission, a corresponding to a unicast PUCCH resource on an antenna port $p_0$ is equal to 0, and a corresponding to a unicast PUCCH resource on an antenna port $p_1$ is equal to 1.

If the receiving device selects, according to the resource mapping relationship, the multicast feedback resource corresponding to the multicast data as the feedback resource, the multicast feedback resource is a multicast PUCCH resource. The multicast PUCCH resource meets the following formula 2 or formula 3:

$$n_{PUCCH} = n_{CCE} + N_{PUCCH}^{(1)} + F(n_{RNTI}) \quad \text{Formula 2}$$

In the formula 2, $n_{PUCCH}$ represents the multicast PUCCH resource; $n_{CCE}$ represents a number of the first CCE occupied by a multicast PDCCH resource, where the multicast PDCCH resource is used to carry a scheduling resource transmitted on a multicast PDSCH; and $N_{PUCCH}^{(1)}$ represents an offset that is of a multicast PUCCH resource region and that is configured by using higher layer signaling. For example, when one antenna is used for transmission, $F(n_{RNTI})$ corresponding to a multicast PUCCH resource on an antenna port $p_0$ meets $F(n_{RNTI}) = n_{RNTI}$ mod L. When two antennas are used for transmission, $F(n_{RNTI})$ corresponding to a multicast PUCCH resource on an antenna port $p_0$ and $F(n_{RNTI})$ corresponding to a multicast PUCCH resource on an antenna port $p_1$ both meet $F(n_{RNTI}) = n_{RNTI}$ mod L; or $F(n_{RNTI})$ corresponding to a multicast PUCCH resource on an antenna port $p_0$ meets $$F_{p_0}(n_{RNTI}) = 2 \times \left( n_{RNTI} \bmod \left( \frac{L}{2} \right) \right),$$

and $F(n_{RNTI})$ corresponding to a multicast PUCCH resource on an antenna port $p_1$ meets $$F_{p_1}(n_{RNTI}) = 2 \times \left( n_{RNTI} \bmod \left( \frac{L}{2} \right) \right) + 1,$$

where $n_{RNTI}$ represents a radio network temporary identifier (RNTI), that is, an identifier of the receiving device, and L represents a CCE aggregation level.

$$n_{PUCCH} = n_{CCE} + N_{PUCCH}^{(1)} + k \quad \text{Formula 3}$$

In the formula 3, $n_{PUCCH}$ represents the multicast PUCCH resource; $n_{CCE}$ represents a number of the first CCE occupied by a multicast PDCCH resource, where the multicast PDCCH resource is used to carry a scheduling resource transmitted on a multicast PDSCH; and $N_{PUCCH}^{(1)}$ represents an offset that is of a multicast PUCCH resource region and that is configured by using higher layer signaling. For example, when one antenna is used for transmission, a value range of k corresponding to a multicast PUCCH resource on an antenna port $p_0$ [0, L−1], where L represents a CCE aggregation level. When two antennas are used for transmission, a value range of $k_{p_0}$ corresponding to a multicast PUCCH resource on an antenna port $p_0$ and a value range of $k_{p_1}$ corresponding to a multicast PUCCH resource on an antenna port $p_1$ both are [0, L−1], where L represents a CCE aggregation level; or $p_0$ meets $k_{p_0}=2 \times k$, and $k_{p_1}$ corresponding to a multicast PUCCH resource on an antenna port $p_1$ meets $k_{p_1}=2 \times k+1$, where a value range of k is $$\left[0, \frac{L}{2} - 1\right].$$

In an existing multicast PDSCH transmission mechanism, all receiving devices in multicast determine a multicast PUCCH resource for feeding back acknowledgement information (that is, HARQ-ACK feedback information) by using a same method. Therefore, multicast PUCCH resources used by different receiving devices to feed back acknowledgement information to the sending device are the same. The sending device receives, from the same multicast PUCCH resource, the acknowledgement information fed back by the multiple receiving devices. The sending device cannot distinguish between the acknowledgement information corresponding to different receiving devices, and therefore, cannot retransmit multicast PDSCH data to the receiving device.

However, by using the method for determining a multicast PUCCH resource provided in this embodiment, multicast PUCCH resources determined by different receiving devices are different. Therefore, the sending device can distinguish between acknowledgement information fed back by the different receiving devices, so as to avoid a problem in the existing mechanism that the sending device cannot identify acknowledgement information because different receiving devices in multicast feed back the acknowledgement information by using a same multicast PUCCH resource.

In this embodiment, before the receiving device sends the acknowledgement information to the sending device by using the feedback resource, the receiving device determines the acknowledgement information according to the data receiving status and an acknowledgement mapping relationship. The acknowledgement mapping relationship is used to indicate a mapping relationship between the data receiving status and the acknowledgement information. Specifically, the receiving device may set two-bit information in the acknowledgement information according to the data receiving status and the acknowledgement mapping relationship.

Figure 2:
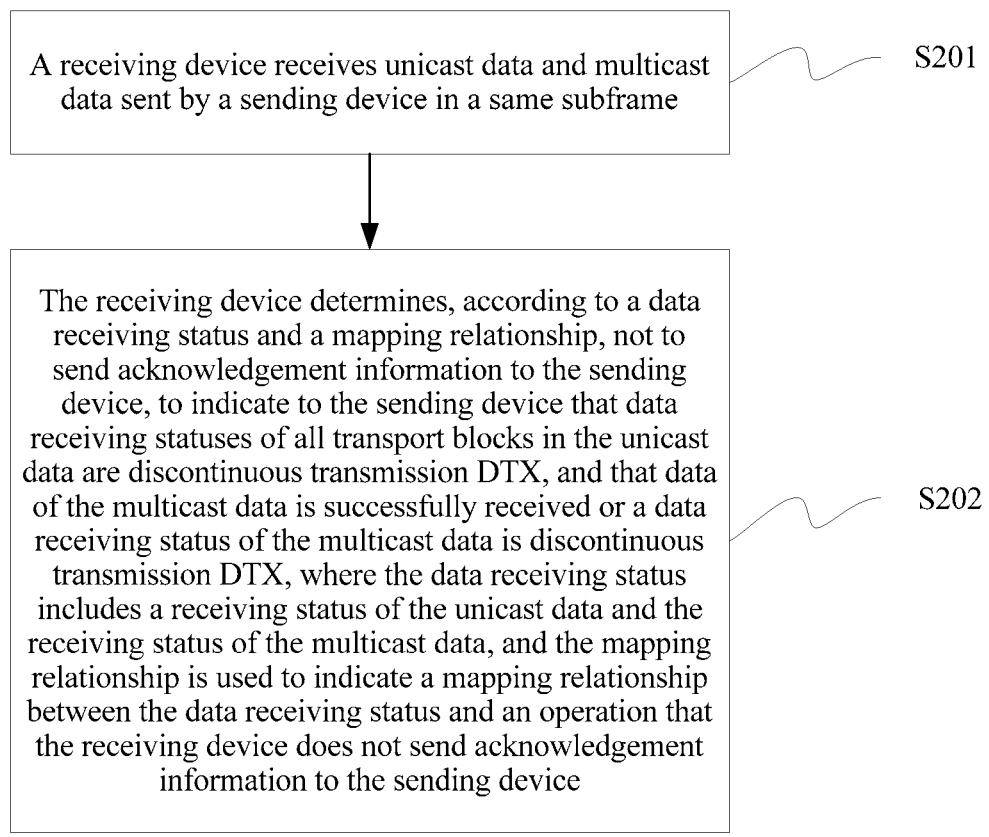
FIG. 2 is schematic flowchart of a data receiving status indication method according to an embodiment of the present invention.

In the acknowledgement information sending method shown in FIG. 1, the feedback resource and the acknowledgement information jointly indicate the data receiving status. This embodiment of the present invention further provides a method for indicating a data receiving status to a sending device by not feeding back, by a receiving device, acknowledgement information to the sending device. As shown in FIG. 2, this embodiment of the present invention provides a data receiving status indication method, and the method includes the following steps.

S201: A receiving device receives unicast data and multicast data sent by a sending device in a same subframe.

S202: The receiving device determines, according to a data receiving status and a mapping relationship, not to send acknowledgement information to the sending device, to indicate to the sending device that data receiving statuses of all transport blocks in the unicast data are discontinuous transmission DTX, and that data of the multicast data is successfully received or a receiving status of the multicast data is discontinuous transmission DTX.

The data receiving status includes a receiving status of the unicast data and the receiving status of the multicast data, and the mapping relationship is used to indicate a mapping relationship between the data receiving status and an operation that the receiving device does not send acknowledgement information to the sending device.

In this embodiment, the mapping relationship includes: when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

For example, if the unicast data includes data of only one transport block, and the data receiving status is represented in a form of (X, Y), where X represents a data receiving status of the transport block in the unicast data, and Y represents the receiving status of the multicast data, the mapping relationship is used to indicate that when the data receiving status is (DTX, ACK/DTX), the receiving device does not feed back acknowledgement information to the sending device. If the unicast data includes data of two transport blocks, and the data receiving status is represented in a form of (X1, X2, Y), where X1 and X2 respectively represent data receiving statuses of the transport blocks in the unicast data, and Y represents the receiving status of the multicast data, the mapping relationship is used to indicate that when the data receiving status is (DTX, DTX, ACK/DTX), the receiving device does not feed back acknowledgement information to the sending device.

The receiving device determines, according to the data receiving status, not to send acknowledgement information to the sending device. Therefore, when detecting no acknowledgement information sent by the receiving device, the sending device can learn that the data receiving statuses of all the transport blocks in the unicast data are discontinuous transmission DTX, and that the data of the multicast data is successfully received or the receiving status of the multicast data is discontinuous transmission DTX, and then determine whether to retransmit the unicast data and/or the multicast data to the receiving device.

In this embodiment, a correspondence between a feedback resource, acknowledgement information, and a data receiving status may be demonstrated by using a table. The receiving device may determine, by querying the table, how to indicate the data receiving status to the sending device.

With reference to the methods shown in FIG. 1 and FIG. 2, for example, if the unicast data and the multicast data separately correspond to one data receiving status (the unicast data is SPS release signaling or unicast PDSCH data that supports one transport block, and the multicast data is multicast PDSCH data), the correspondence between the feedback resource, the acknowledgement information, and the data receiving status may be demonstrated by using Table 1:

TABLE 1

| Receiving status of the unicast data | Receiving status of the multicast data | Feedback resource | Two-bit information in the acknowledgement information |
|---|---|---|---|
| ACK | ACK/DTX | $n_{PUCCH,0}$ | 1, 1 |
| ACK | NACK | $n_{PUCCH,0}$ | 1, 0 |
| NACK | ACK/DTX | $n_{PUCCH,0}$ | 0, 0 |
| NACK/DTX | NACK | $n_{PUCCH,1}$ | 0, 0 |
| DTX | ACK/DTX | | No Transmission |

In Table 1, $n_{PUCCH,0}$ represents a unicast PUCCH feedback resource corresponding to the unicast data, and $n_{PUCCH,1}$ represents a multicast PUCCH feedback resource corresponding to the multicast data. No Transmission represents that the receiving device does not send acknowledgement information to the sending device.

Alternatively, if the unicast data and the multicast data separately correspond to one data receiving status (the unicast data is SPS release signaling or unicast PDSCH data that supports one transport block, and the multicast data is multicast PDSCH data), the correspondence between the feedback resource, the acknowledgement information, and the data receiving status may also be demonstrated by using Table 2:

TABLE 2

| Receiving status of the unicast data | Receiving status of the multicast data | Feedback resource | Two-bit information in the acknowledgement information |
|---|---|---|---|
| ACK | ACK/DTX | $n_{PUCCH,0}$ | 1, 1 |
| NACK | ACK/DTX | $n_{PUCCH,0}$ | 0, 0 |
| NACK/DTX | NACK | $n_{PUCCH,1}$ | 0, 0 |
| DTX | ACK/DTX | | No Transmission |

In Table 2, $n_{PUCCH,0}$ represents a unicast PUCCH feedback resource corresponding to the unicast data, and $n_{PUCCH,1}$ represents a multicast PUCCH feedback resource corresponding to the multicast data. No Transmission represents that the receiving device does not send acknowledgement information to the sending device.

In comparison with Table 1, in Table 2, there is no combination of the data receiving status ACK of the unicast data and the data receiving status NACK of the multicast data mainly because a probability that the receiving device successfully receives the unicast data but the receiving device fails to receive the multicast data is relatively small. Therefore, when the receiving device determines that the receiving status of the unicast data is ACK and that the receiving status of the multicast data is NACK, the receiving device performs processing according to a case in which the receiving status of the unicast data is ACK and the receiving status of the multicast data is ACK, or the receiving device performs processing according to a case in which the receiving status of the unicast data is NACK and the receiving status of the multicast data is NACK.

With reference to the methods shown in FIG. 1 and FIG. 2, for example, if the unicast data corresponds to two data receiving statuses and the multicast data corresponds to one data receiving status (the unicast data is unicast PDSCH data that supports two data blocks, and the multicast data is multicast PDSCH data), the correspondence between the feedback resource, the acknowledgement information, and the data receiving status may be demonstrated by using Table 3:

TABLE 3

| Data receiving status 1 of the unicast data | Data receiving status 2 of the unicast data | Receiving status of the multicast data | Feedback resource | Two-bit information in the acknowledgement information |
|---|---|---|---|---|
| ACK | ACK | ACK/DTX | $n_{PUCCH,0}$ | 1, 1 |
| ACK | NACK/DTX | ACK/DTX | $n_{PUCCH,0}$ | 1, 1 |
| NACK/DTX | ACK | ACK/DTX | $n_{PUCCH,0}$ | 1, 0 |
| ACK | ACK | NACK | $n_{PUCCH,0}$ | 1, 0 |
| ACK | NACK/DTX | NACK | $n_{PUCCH,0}$ | 0, 1 |
| NACK/DTX | ACK | NACK | $n_{PUCCH,0}$ | 0, 0 |
| NACK/DTX | NACK/DTX | NACK | $n_{PUCCH,1}$ | 0, 0 |
| NACK | NACK/DTX | ACK/DTX | $n_{PUCCH,0}$ | 0, 0 |
| NACK/DTX | NACK | ACK/DTX | $n_{PUCCH,0}$ | 0, 0 |
| DTX | DTX | ACK/DTX | | No Transmission |

In Table 3, $n_{PUCCH,0}$ represents a unicast PUCCH feedback resource corresponding to the unicast data, and $n_{PUCCH,1}$ represents a multicast PUCCH feedback resource corresponding to the multicast data. No Transmission represents that the receiving device does not send acknowledgement information to the sending device.

In this way, after receiving the acknowledgement information from the feedback resource, the sending device may learn of the data receiving status of the receiving device according to a resource mapping relationship and an acknowledgement mapping relationship, and then determine whether data needs to be retransmitted to the receiving device. Alternatively, when the sending device detects no acknowledgement information sent by the receiving device, the sending device can learn of the data receiving status of the receiving device, and then determine whether to retransmit data to the receiving device.

In this embodiment of the present invention, after a receiving device receives unicast data and multicast data sent by a sending device in a same subframe, the receiving device indicates a data receiving status to the sending device in either of two manners: sending acknowledgement information to the sending device by using a selected feedback resource and not sending acknowledgement information to the sending device. When the receiving device indicates the data receiving status to the sending device by sending acknowledgement information to the sending device by using the selected feedback resource, the feedback resource and the acknowledgement information jointly indicate a receiving status of the unicast data and a receiving status of the multicast data. Further, the sending device may determine, according to the data receiving status of the receiving device, whether the unicast data and/or the multicast data need/needs to be retransmitted to the receiving device. Therefore, by using the technical solutions provided in this embodiment of the present invention, the receiving device can synchronously feed back the receiving status of the unicast data and the receiving status of the multicast data to the sending device. By using the method for determining a multicast PUCCH resource provided in this embodiment, multicast PUCCH resources determined by different receiving devices are different. Therefore, the sending device can distinguish between acknowledgement information fed back by the different receiving devices, so as to avoid a problem in an existing mechanism that the sending device cannot identify acknowledgement information because different receiving devices in multicast feed back the acknowledgement information by using a same multicast PUCCH resource.

Embodiment 2

Figure 3:
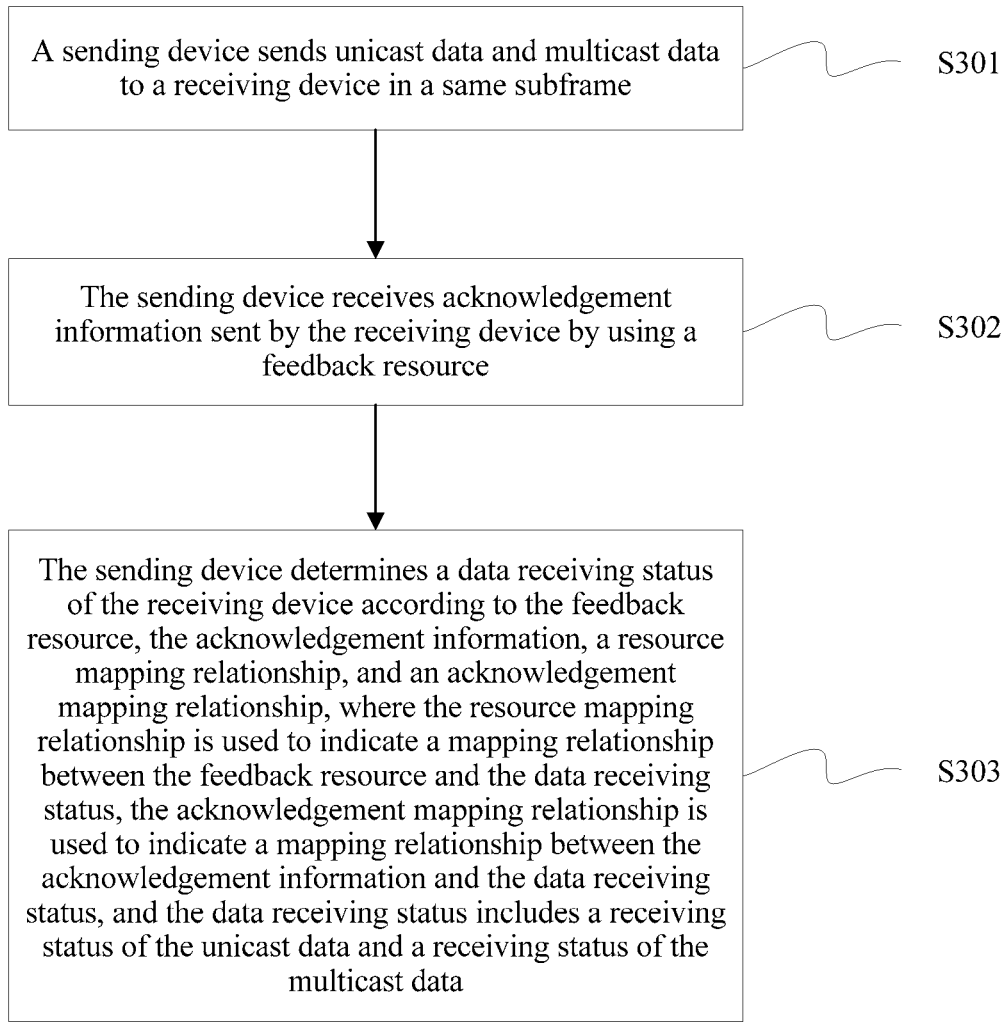
FIG. 3 is a schematic flowchart of an acknowledgement information receiving method according to an embodiment of the present invention.

Corresponding to FIG. 1, on a sending device side, as shown in FIG. 3, this embodiment of the present invention provides an acknowledgement information receiving method, and the method includes the following steps.

S301: A sending device sends unicast data and multicast data to a receiving device in a same subframe.

S302: The sending device receives acknowledgement information sent by the receiving device by using a feedback resource.

S303: The sending device determines a data receiving status of the receiving device according to the feedback resource, the acknowledgement information, a resource mapping relationship, and an acknowledgement mapping relationship.

The resource mapping relationship is used to indicate a mapping relationship between the feedback resource and the data receiving status, the acknowledgement mapping relationship is used to indicate a mapping relationship between the acknowledgement information and the data receiving status, and the data receiving status includes a receiving status of the unicast data and a receiving status of the multicast data.

In this embodiment, the unicast data is unicast PDSCH data or SPS release signaling, and the multicast data is multicast PDSCH data.

Before the sending device receives the acknowledgement information sent by the receiving device by using the feedback resource, the sending device sends a unicast PDCCH and a multicast PDCCH to the receiving device. The unicast PDCCH carries scheduling information transmitted on a unicast PDSCH or SPS release signaling. The multicast PDCCH carries scheduling information transmitted on a multicast PDSCH. The sending device sends unicast PDSCH data and multicast PDSCH data to the receiving device, or the sending device sends SPS release signaling and multicast PDSCH data to the receiving device.

Optionally, the sending device sends one piece of unicast data and N pieces of multicast data to the receiving device in the same subframe, and N is a positive integer. Further, the unicast data and the multicast data are carried on a same carrier.

In this embodiment, a PDCCH includes a PDCCH defined in Rel-8/9/10, an ePDCCH defined after Rel-10, and a possible evolved PDCCH in the future. The PDCCH and a PDSCH defined in Rel-8/9/10 are based on time division. A new PDCCH region is introduced in an LTE system after Rel-10. A PDCCH and a PDSCH in this region are based on frequency division. A PDCCH defined after Rel-10 is an ePDCCH.

In this embodiment, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data; or the second relationship is used to indicate that when data of at least one transport block in the unicast data fails to be received, and data of the multicast data is successfully received or the receiving status of the multicast data is discontinuous transmission DTX, the feedback resource is a unicast feedback resource corresponding to the unicast data; and/or a third relationship, where the third relationship is used to indicate that when a data receiving status of a transport block in the unicast data does not include successfully received, and data of the multicast data fails to be received, the feedback resource is a multicast feedback resource corresponding to the multicast data; or further, the third relationship is used to indicate that when data of all transport blocks in the unicast data fails to be received, and data of the multicast data fails to be received, the feedback resource is a multicast feedback resource corresponding to the multicast data.

For example, if the unicast data includes data of only one transport block, and the data receiving status is represented in a form of (X, Y), where X represents a data receiving status of the transport block in the unicast data, and Y represents the receiving status of the multicast data, the first relationship is used to indicate that when the data receiving status is (ACK, ACK/NACK/DTX), the feedback resource is the unicast feedback resource corresponding to the unicast data; the second relationship is used to indicate that when the data receiving status is (NACK, ACK/DTX), the feedback resource is the unicast feedback resource corresponding to the unicast data; and the third relationship is used to indicate that when the data receiving status is (NACK/DTX, NACK), the feedback resource is the multicast feedback resource corresponding to the multicast data.

For example, if the unicast data includes data of two transport blocks, and the data receiving status is represented in a form of (X1, X2, Y), where X1 and X2 respectively represent data receiving statuses of the transport blocks in the unicast data, and Y represents the receiving status of the multicast data, the first relationship is used to indicate that when the data receiving status is (ACK, ACK, ACK/NACK/DTX) or (ACK, NACK/DTX, ACK/NACK/DTX), the feedback resource is the unicast feedback resource corresponding to the unicast data; the second relationship is used to indicate that when the data receiving status is (NACK, NACK, ACK/DTX), the feedback resource is the unicast feedback resource corresponding to the unicast data; and the third relationship is used to indicate that when the data receiving status is (NACK/DTX, NACK/DTX, NACK), the feedback resource is the multicast feedback resource corresponding to the multicast data.

In this embodiment, the acknowledgement information received by the sending device may be specifically bit information of the acknowledgement information. The bit information of the acknowledgement information is set by the receiving device according to the data receiving status and the acknowledgement mapping relationship.

In this embodiment, the data receiving status includes a receiving status of the unicast data and a receiving status of the multicast data, where the unicast data and the multicast data are sent by the sending device and received by the receiving device. The data receiving status includes acknowledgement ACK, negative acknowledgement NACK, and discontinuous transmission DTX.

For the unicast PDSCH data or the multicast PDSCH data, ACK represents that the data is successfully received, NACK represents that the data fails to be received, and DTX represents that no PDSCH data is received. If the unicast data is SPS release signaling, when a data receiving status of the SPS release signaling is ACK, it represents that the receiving device detects a PDCCH that is sent by the sending device and that carries the SPS release signaling; or when a data receiving status of the SPS release signaling is DTX, it represents that the receiving device detects no PDCCH that is sent by the sending device and that carries the SPS release signaling.

The unicast data corresponds to one or two data receiving statuses. When the unicast data is SPS release signaling, a data receiving status of the SPS release signaling is ACK or DTX. When the unicast data is unicast PDSCH data, the receiving status of the unicast data includes a data receiving status of each transport block in the unicast PDSCH data. That is, when unicast PDSCH transmission supports one transport block, the receiving status of the unicast data includes a data receiving status of the one transport block; or when unicast PDSCH transmission supports two transport blocks, the receiving status of the unicast data includes data receiving statuses respectively corresponding to the two transport blocks.

The multicast data corresponds to one data receiving status. The receiving status of the multicast data is information obtained after data receiving statuses of N pieces of multicast data are processed. Optionally, the receiving status of the multicast data is a logical AND operation result of the data receiving statuses of the N pieces of multicast data, and a data receiving status of each piece of multicast data is a logical AND operation result of data receiving statuses of all transport blocks in the multicast data. Multicast transmission is multicast PDSCH transmission, and multicast PDSCH transmission supports one transport block or two transport blocks.

In this embodiment, optionally, the sending device determines a feedback resource that may be used by the receiving device to send the acknowledgement information. The feedback resource includes a unicast feedback resource corresponding to the unicast data and a multicast feedback resource corresponding to the multicast data. The sending device performs monitoring on the feedback resource that may be used by the receiving device to send the acknowledgement information, to receive the acknowledgement information sent by the receiving device.

If the unicast feedback resource that is determined by the sending device and that may be used by the receiving device to send the acknowledgement information is a unicast PUCCH resource, the unicast PUCCH resource meets the following formula 4:

$$n_{PUCCH} = n_{CCE} + N_{PUCCH}^{(1)} + a \quad \text{Formula 4}$$

In the formula 4, $n_{PUCCH}$ represents the unicast PUCCH resource; $n_{CCE}$ represents a number of the first control channel element CCE occupied by a unicast PDCCH resource, where the unicast PDCCH resource is used to carry scheduling information transmitted on a unicast PDSCH or SPS release signaling; and $N_{PUCCH}^{(1)}$ represents an offset that is of a unicast PUCCH resource region and that is configured by using higher layer signaling. For example, when one antenna is used for transmission, a corresponding to a unicast PUCCH resource on an antenna port $p_0$ is equal to 0. When two antennas are used for transmission, a corresponding to a unicast PUCCH resource on an antenna port $p_0$ is equal to 0, and a corresponding to a unicast PUCCH resource on an antenna port $p_1$ is equal to 1.

If the multicast feedback resource that is determined by the sending device and that may be used by the receiving device to send the acknowledgement information is a multicast PUCCH resource, the multicast PUCCH resource meets the following formula 5 or 6:

$$n_{PUCCH} = n_{CCE} + N_{PUCCH}^{(1)} + F(n_{RNTI}) \quad \text{Formula 5}$$

In the formula 5, $n_{PUCCH}$ represents the multicast PUCCH resource; $n_{CCE}$ represents a number of the first CCE occupied by a multicast PDCCH resource, where the multicast PDCCH resource is used to carry a scheduling resource transmitted on a multicast PDSCH; and $N_{PUCCH}^{(1)}$ represents an offset that is of a multicast PUCCH resource region and that is configured by using higher layer signaling. For example, when one antenna is used for transmission, $F(n_{RNTI})$ corresponding to a multicast) PUCCH resource on an antenna port $p_0$ meets $F(n_{RNTI}) = n_{RNTI} \mod L$. When two antennas are used for transmission, $F(n_{RNTI})$ corresponding to a multicast PUCCH resource on an antenna port $p_0$ and $F(n_{RNTI})$ corresponding to a multicast PUCCH resource on an antenna port $p_1$ both meet $F(n_{RNTI}) = n_{RNTI} \mod L$; or $F(n_{RNTI})$ corresponding to a multicast PUCCH resource on an antenna port $p_0$ meets $$F_{p_0}(n_{RNTI}) = 2 \times \left(n_{RNTI} \mod \left(\frac{L}{2}\right)\right),$$

and $F(n_{RNTI})$ corresponding to a multicast PUCCH resource on an antenna port $p_1$ meets $$F_{p_1}(n_{RNTI}) = 2 \times \left(n_{RNTI} \mod \left(\frac{L}{2}\right)\right) + 1,$$

where $n_{RNTI}$ represents a radio network temporary identifier (RNTI), that is, an identifier of the receiving device, and L represents a CCE aggregation level.

$$n_{PUCCH} = n_{CCE} + N_{PUCCH}^{(1)} + k \quad \text{Formula 6}$$

In the formula 6, $n_{PUCCH}$ represents the multicast PUCCH resource; $n_{CCE}$ represents a number of the first CCE occupied by a multicast PDCCH resource, where the multicast PDCCH resource is used to carry a scheduling resource transmitted on a multicast PDSCH; and $n_{PUCCH}^{(1)}$ represents an offset that is of a multicast PUCCH resource region and that is configured by using higher layer signaling. For example, when one antenna is used for transmission, a value range of k corresponding to a multicast PUCCH resource on an antenna port $p_0$ is [0, L−1], where L represents a CCE aggregation level. When two antennas are used for transmission, a value range of $k_{p_0}$ corresponding to a multicast PUCCH resource on an antenna port $p_0$ and a value range of $k_{p_1}$ corresponding to a multicast PUCCH resource on an antenna port $p_1$ both are [0, L−1], where L represents a CCE aggregation level; or $k_{p_0}$ corresponding to a multicast PUCCH resource on an antenna port $p_0$ meets $k_{p_0} = 2 \times k$, and $k_{p_1}$ corresponding to a multicast PUCCH resource on an antenna port $p_1$ meets $k_{p_1} = 2 \times k + 1$, where a value range of k is $$\left[0, \frac{L}{2} - 1\right].$$

Figure 4:
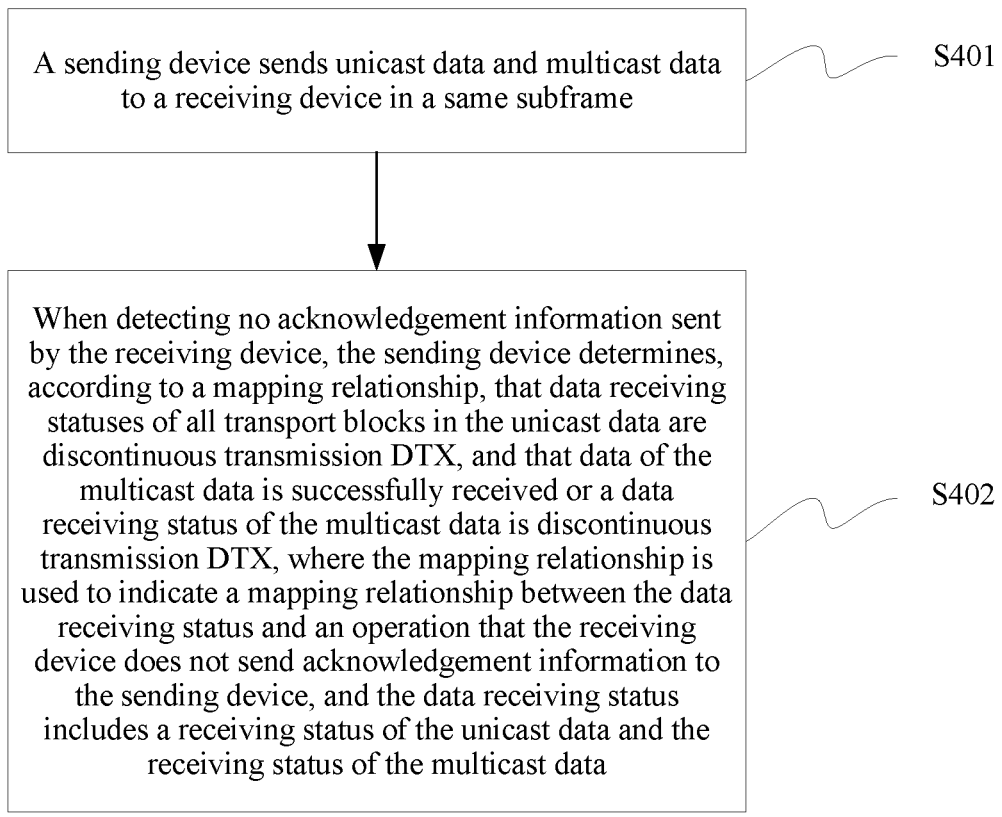
FIG. 4 is schematic flowchart of a data receiving status indication method according to an embodiment of the present invention.

In the acknowledgement information receiving method shown in FIG. 3, the feedback resource and the acknowledgement information jointly indicate the data receiving status. This embodiment of the present invention further provides a method for indicating a data receiving status to a sending device by not feeding back, by a receiving device, acknowledgement information to the sending device. Corresponding to the method shown in FIG. 2, on a sending device side, as shown in FIG. 4, this embodiment of the present invention provides a data receiving status indication method, and the method includes the following steps.

S401: A sending device sends unicast data and multicast data to a receiving device in a same subframe.

S402: When detecting no acknowledgement information sent by the receiving device, the sending device determines, according to a mapping relationship, that data receiving statuses of all transport blocks in the unicast data are discontinuous transmission DTX, and that data of the multicast data is successfully received or a receiving status of the multicast data is discontinuous transmission DTX.

The mapping relationship is used to indicate a mapping relationship between a data receiving status and an operation that the receiving device does not send acknowledgement information to the sending device, and the data receiving status includes a receiving status of the unicast data and the receiving status of the multicast data.

In this embodiment, the mapping relationship includes: when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

For example, if the unicast data includes data of only one transport block, and the data receiving status is represented in a form of (X, Y), where X represents a data receiving status of the transport block in the unicast data, and Y represents the receiving status of the multicast data, the mapping relationship is used to indicate that when the data receiving status is (DTX, ACK/DTX), the receiving device does not feed back acknowledgement information to the sending device. If the unicast data includes data of two transport blocks, and the data receiving status is represented in a form of (X1, X2, Y), where X1 and X2 respectively represent data receiving statuses of the transport blocks in the unicast data, and Y represents the receiving status of the multicast data, the mapping relationship is used to indicate that when the data receiving status is (DTX, DTX, ACK/DTX), the receiving device does not feed back acknowledgement information to the sending device.

In this embodiment, the receiving device may determine, according to the data receiving status and the mapping relationship, not to send acknowledgement information to the sending device. Therefore, when detecting no acknowledgement information sent by the receiving device, the sending device may learn, according to the mapping relationship, that the data receiving statuses of all the transport blocks in the unicast data are discontinuous transmission DTX, and that the data of the multicast data is successfully received or the receiving status of the multicast data is discontinuous transmission DTX.

In this embodiment, a correspondence between a feedback resource, acknowledgement information, and a data receiving status may be demonstrated by using a table. The sending device may learn, by querying the table, the data receiving status of the receiving device.

With reference to the methods shown in FIG. 3 and FIG. 4, for example, if the unicast data and the multicast data separately correspond to one data receiving status (the unicast data is SPS release signaling or unicast PDSCH data that supports one transport block, and the multicast data is multicast PDSCH data), the correspondence between the feedback resource, the acknowledgement information, and the data receiving status may be demonstrated by using Table 4:

TABLE 4

| Receiving status of the unicast data | Receiving status of the multicast data | Feedback resource | Two-bit information in the acknowledgement information |
|---|---|---|---|
| ACK | ACK/DTX | $n_{PUCCH,0}$ | 1, 1 |
| ACK | NACK | $n_{PUCCH,0}$ | 1, 0 |
| NACK | ACK/DTX | $n_{PUCCH,0}$ | 0, 0 |
| NACK/DTX | NACK | $n_{PUCCH,1}$ | 0, 0 |
| DTX | ACK/DTX | | No Transmission |

In Table 4, $n_{PUCCH,0}$ represents a unicast PUCCH feedback resource corresponding to the unicast data, and $n_{PUCCH,1}$ represents a multicast PUCCH feedback resource corresponding to the multicast data. No Transmission represents that the receiving device does not send acknowledgement information to the sending device.

Alternatively, if the unicast data and the multicast data separately correspond to one data receiving status (the unicast data is SPS release signaling or unicast PDSCH data that supports one transport block, and the multicast data is multicast PDSCH data), the correspondence between the feedback resource, the acknowledgement information, and the data receiving status may also be demonstrated by using Table 5:

TABLE 5

| Receiving status of the unicast data | Receiving status of the multicast data | Feedback resource | Two-bit information in the acknowledgement information |
|---|---|---|---|
| ACK | ACK/DTX | $n_{PUCCH,0}$ | 1, 1 |
| NACK | ACK/DTX | $n_{PUCCH,0}$ | 0, 0 |
| NACK/DTX | NACK | $n_{PUCCH,1}$ | 0, 0 |
| DTX | ACK/DTX | | No Transmission |

In Table 5, $n_{PUCCH,0}$ represents a unicast PUCCH feedback resource corresponding to the unicast data, and $n_{PUCCH,1}$ represents a multicast PUCCH feedback resource corresponding to the multicast data. No Transmission represents that the receiving device does not send acknowledgement information to the sending device.

In comparison with Table 4, in Table 5, there is no combination of the data receiving status ACK of the unicast data and the data receiving status NACK of the multicast data mainly because a probability that the receiving device successfully receives the unicast data but the receiving device fails to receive the multicast data is relatively small. Therefore, when the receiving device determines that the receiving status of the unicast data is ACK and that the receiving status of the multicast data is NACK, the receiving device performs processing according to a case in which the receiving status of the unicast data is ACK and the receiving status of the multicast data is ACK, or the receiving device performs processing according to a case in which the receiving status of the unicast data is NACK and the receiving status of the multicast data is NACK.

With reference to the methods shown in FIG. 3 and FIG. 4, for example, if the unicast data corresponds to two data receiving statuses and the multicast data corresponds to one data receiving status (the unicast data is unicast PDSCH data that supports two data blocks, and the multicast data is multicast PDSCH data), the correspondence between the feedback resource, the acknowledgement information, and the data receiving status may be demonstrated by using Table 6:

TABLE 6

| Data receiving status 1 of the unicast data | Data receiving status 2 of the unicast data | Receiving status of the multicast data | Feedback resource | Two-bit information in the acknowledgement information |
|---|---|---|---|---|
| ACK | ACK | ACK/DTX | $n_{PUCCH,0}$ | 1, 1 |
| ACK | NACK/DTX | ACK/DTX | $n_{PUCCH,0}$ | 1, 1 |
| NACK/DTX | ACK | ACK/DTX | $n_{PUCCH,0}$ | 1, 0 |
| ACK | ACK | NACK | $n_{PUCCH,0}$ | 1, 0 |
| ACK | NACK/DTX | NACK | $n_{PUCCH,0}$ | 0, 1 |
| NACK/DTX | ACK | NACK | $n_{PUCCH,0}$ | 0, 0 |
| NACK/DTX | NACK/DTX | NACK | $n_{PUCCH,1}$ | 0, 0 |
| NACK | NACK/DTX | ACK/DTX | $n_{PUCCH,0}$ | 0, 0 |
| NACK/DTX | NACK | ACK/DTX | $n_{PUCCH,0}$ | 0, 0 |
| DTX | DTX | ACK/DTX | | No Transmission |

In Table 6, $n_{PUCCH,0}$ represents a unicast PUCCH feedback resource corresponding to the unicast data, and $n_{PUCCH,1}$ represents a multicast PUCCH feedback resource corresponding to the multicast data. No Transmission represents that the receiving device does not send acknowledgement information to the sending device.

In this way, after receiving the acknowledgement information from the feedback resource, the sending device may learn of the data receiving status of the receiving device according to a resource mapping relationship and an acknowledgement mapping relationship, and then determine whether data needs to be retransmitted to the receiving device. Alternatively, when the sending device detects no acknowledgement information sent by the receiving device, the sending device can learn of the data receiving status of the receiving device, and then determine whether to retransmit data to the receiving device.

In this embodiment, if the sending device does not receive, in a preset time range, HARQ-ACK feedback information sent by the receiving device, the sending device determines that data receiving status information of the unicast data and data receiving status information of the multicast data both are discontinuous transmission DTX, or that data receiving status information of the unicast data is DTX and data receiving status information of the multicast data is acknowledgement ACK.

In this embodiment of the present invention, after a sending device sends unicast data and multicast data to a receiving device in a same subframe, the receiving device indicates a data receiving status to the sending device in either of two manners: sending acknowledgement information to the sending device by using a feedback resource and not sending acknowledgement information to the sending device. When the sending device receives the acknowledgement information sent by the receiving device by using the feedback resource, the feedback resource and the acknowledgement information jointly indicate a receiving status of the unicast data and a receiving status of the multicast data. The sending device may determine, according to the data receiving status of the receiving device, whether the unicast data and/or the multicast data need/needs to be retransmitted to the receiving device. Therefore, by using the technical solutions provided in this embodiment of the present invention, the receiving device can synchronously feed back the receiving status of the unicast data and the receiving status of the multicast data to the sending device. Multicast PUCCH resources determined by different receiving devices are different. Therefore, the sending device can distinguish between acknowledgement information fed back by the different receiving devices, so as to avoid a problem in an existing mechanism that the sending device cannot identify acknowledgement information because different receiving devices in multicast feed back the acknowledgement information by using a same multicast PUCCH resource.

Embodiment 3

Figure 5:
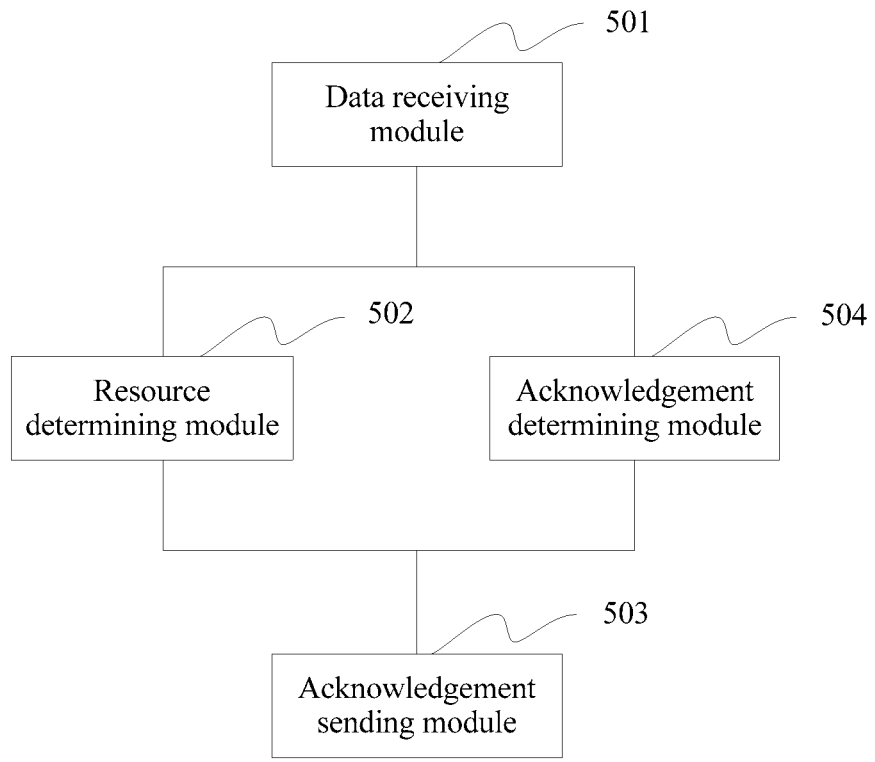
FIG. 5 is a schematic structural diagram of a receiving device according to an embodiment of the present invention.

Corresponding to FIG. 1, as shown in FIG. 5, this embodiment of the present invention provides a receiving device, and the receiving device includes:

a data receiving module 501, configured to receive unicast data and multicast data sent by a sending device in a same subframe;

a resource determining module 502, configured to determine a feedback resource according to a data receiving status of the data receiving module 501 and a resource mapping relationship, where the data receiving status includes a receiving status of the unicast data and a receiving status of the multicast data, and the resource mapping relationship is used to indicate a mapping relationship between the data receiving status and the feedback resource; and an acknowledgement sending module 503, configured to send acknowledgement information to the sending device by using the feedback resource determined by the resource determining module 502, to notify the sending device of the receiving status of the unicast data and the receiving status of the multicast data.

Optionally, the receiving device shown in FIG. 5 further includes:

an acknowledgement determining module 504, configured to determine the acknowledgement information according to the data receiving status of the data receiving module 501 and an acknowledgement mapping relationship, where the acknowledgement mapping relationship is used to indicate a mapping relationship between the data receiving status and the acknowledgement information.

Optionally, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

Optionally, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

Optionally, the multicast feedback resource is a multicast physical uplink control channel PUCCH resource, and the multicast PUCCH resource meets the following condition:

$$n_{PUCCH} = n_{CCE} + N_{PUCCH}^{(1)} + F(n_{RNTI}),\text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and $F(n_{RNTI})=n_{RNTI} \mod L$, where $n_{RNTI}$ represents a radio network temporary identifier, and L represents a CCE aggregation level.

Optionally, the multicast feedback resource is a multicast physical uplink control channel PUCCH resource, and the multicast PUCCH resource meets the following condition:

$$n_{PUCCH}=n_{CCE}+N_{PUCCH}^{(1)}+k, \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ further represents an offset that is of a multicast PUCCH resource region and that is configured by using higher layer signaling, and a value range of k is [0, L−1], where L represents a CCE aggregation level.

Optionally, when the unicast data is unicast physical downlink shared channel PDSCH data, the receiving status of the unicast data includes a data receiving status of each transport block in the unicast PDSCH data.

Optionally, the receiving status of the multicast data is a logical AND operation result of receiving statuses of N pieces of multicast data, and a receiving status of each piece of multicast data is a logical AND operation result of data receiving statuses of all transport blocks in the multicast data.

Figure 6:
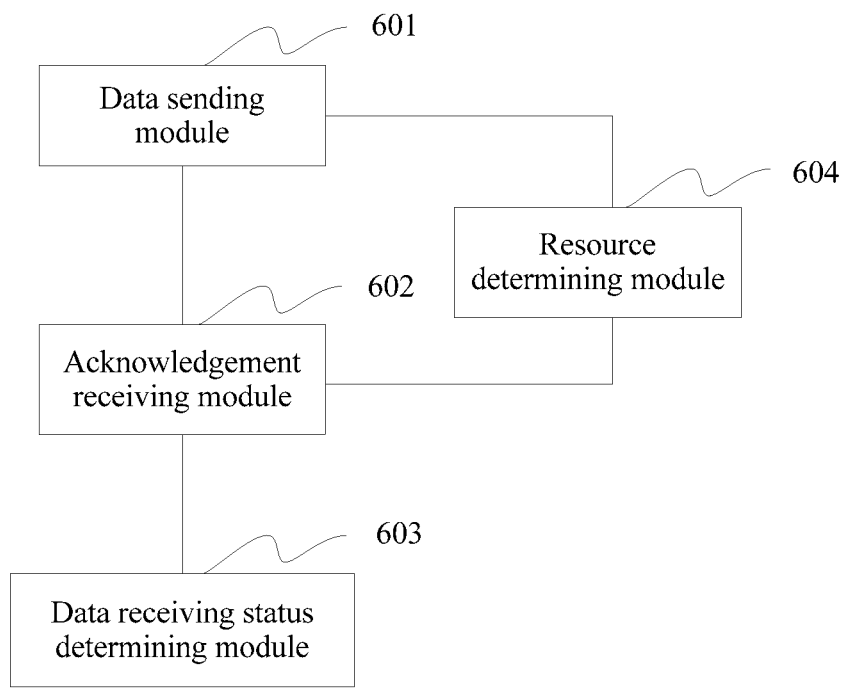
FIG. 6 is a schematic structural diagram of a sending device according to an embodiment of the present invention.

Corresponding to FIG. 3, as shown in FIG. 6, this embodiment of the present invention provides a sending device, and the sending device includes:

a data sending module 601, configured to send unicast data and multicast data to a receiving device in a same subframe;

an acknowledgement receiving module 602, configured to receive acknowledgement information sent by the receiving device by using a feedback resource; and a data receiving status determining module 603, configured to determine a data receiving status of the receiving device according to the feedback resource by using which the acknowledgement receiving module 602 receives the acknowledgement information, the acknowledgement information received by the acknowledgement receiving module 602, a resource mapping relationship, and an acknowledgement mapping relationship.

The resource mapping relationship is used to indicate a mapping relationship between the feedback resource and the data receiving status, the acknowledgement mapping relationship is used to indicate a mapping relationship between the acknowledgement information and the data receiving status, and the data receiving status includes a receiving status of the unicast data and a receiving status of the multicast data.

Optionally, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

Optionally, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

Optionally, the sending device shown in FIG. 6 further includes:

a resource determining module 604, configured to determine a feedback resource that may be used by the receiving device to send the acknowledgement information, where the feedback resource includes a unicast feedback resource corresponding to the unicast data and a multicast feedback resource corresponding to the multicast data.

The acknowledgement receiving module 602 is further configured to perform monitoring on the feedback resource that is determined by the resource determining module and that may be used by the receiving device to send the acknowledgement information, to receive the acknowledgement information sent by the receiving device.

Optionally, the multicast feedback resource is a multicast physical uplink control channel PUCCH resource, and the multicast PUCCH resource meets the following condition:

$$n_{PUCCH}^{(p0)}=n_{CCE}+N_{PUCCH}^{(1)}+F(n_{RNTI}), \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and $F(n_{RNTI})=n_{RNTI} \mod L$, where $n_{RNTI}$ represents a radio network temporary identifier, and L represents a CCE aggregation level.

Optionally, the multicast feedback resource is a multicast physical uplink control channel PUCCH resource, and the multicast PUCCH resource meets the following condition:

$$n_{PUCCH}^{(p0)}=n_{CCE}+N_{PUCCH}^{(1)}+k, \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and a value range of k is [0, L−1], where L represents a CCE aggregation level.

Optionally, when the unicast data is unicast physical downlink shared channel PDSCH data, the receiving status of the unicast data includes a data receiving status of each transport block in the unicast PDSCH data.

Optionally, the receiving status of the multicast data is a logical AND operation result of receiving statuses of N pieces of multicast data, and a receiving status of each piece of multicast data is a logical AND operation result of data receiving statuses of all transport blocks in the multicast data.

Figure 7:
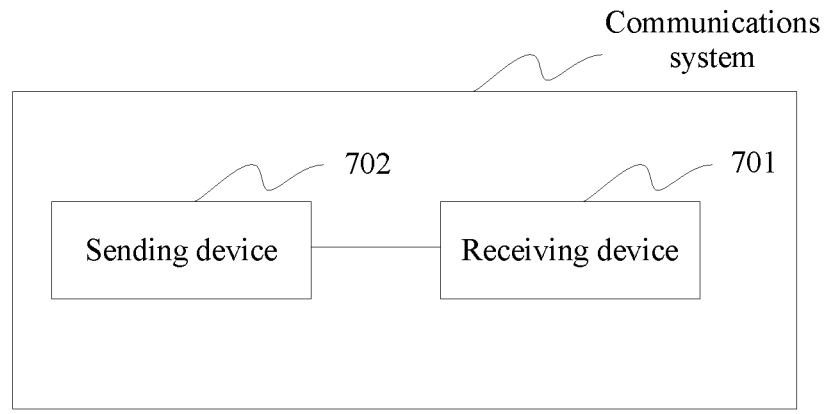
FIG. 7 is a schematic structural diagram of a communications system according to an embodiment of the present invention.

As shown in FIG. 7, this embodiment of the present invention provides a communications system, and the communications system includes a receiving device 701 and a sending device 702.

The receiving device 701 includes the apparatus shown in FIG. 5; and the sending device 702 includes the apparatus shown in FIG. 6.

By using the receiving device, the sending device, and the communications system provided in this embodiment of the present invention, the receiving device can synchronously feed back a receiving status of unicast data and a receiving status of multicast data to the sending device.

Embodiment 4

Figure 8:
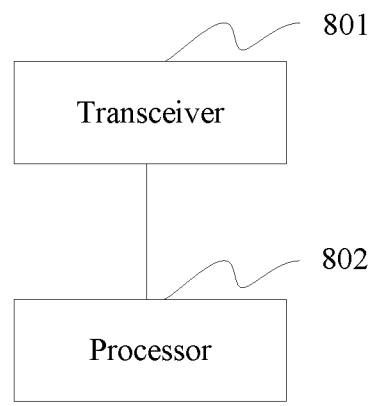
FIG. 8 is a schematic structural diagram of a receiving device according to an embodiment of the present invention.

Corresponding to FIG. 1, as shown in FIG. 8, this embodiment of the present invention provides a receiving device, and the receiving device includes:

a transceiver 801, configured to receive unicast data and multicast data sent by a sending device in a same subframe; and a processor 802, configured to determine a feedback resource according to a data receiving status of the transceiver 801 and a resource mapping relationship, where the data receiving status includes a receiving status of the unicast data and a receiving status of the multicast data, and the resource mapping relationship is used to indicate a mapping relationship between the data receiving status and the feedback resource.

The transceiver 801 is further configured to send acknowledgement information to the sending device by using the feedback resource determined by the processor 802, to notify the sending device of the receiving status of the unicast data and the receiving status of the multicast data.

Optionally, the processor 802 is further configured to:

determine the acknowledgement information according to the data receiving status of the transceiver 801 and an acknowledgement mapping relationship, where the acknowledgement mapping relationship is used to indicate a mapping relationship between the data receiving status and the acknowledgement information.

Optionally, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

Optionally, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

Optionally, the multicast feedback resource is a multicast physical uplink control channel PUCCH resource, and the multicast PUCCH resource meets the following condition:

$n_{PUCCH} = n_{CCE} + N_{PUCCH}^{(1)} + F(n_{RNTI})$, where $n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and $F(n_{RNTI}) = n_{RNTI}$ mod L, where $n_{RNTI}$ represents a radio network temporary identifier, and L represents a CCE aggregation level.

Optionally, the multicast feedback resource is a multicast physical uplink control channel PUCCH resource, and the multicast PUCCH resource meets the following condition:

$n_{PUCCH} = n_{CCE} + N_{PUCCH}^{(1)} + k$, where $n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and a value range of k is [0, L−1], where L represents a CCE aggregation level.

Optionally, when the unicast data is unicast physical downlink shared channel PDSCH data, the receiving status of the unicast data includes a data receiving status of each transport block in the unicast PDSCH data.

Optionally, the receiving status of the multicast data is a logical AND operation result of receiving statuses of N pieces of multicast data, and a receiving status of each piece of multicast data is a logical AND operation result of data receiving statuses of all transport blocks in the multicast data.

Figure 9:
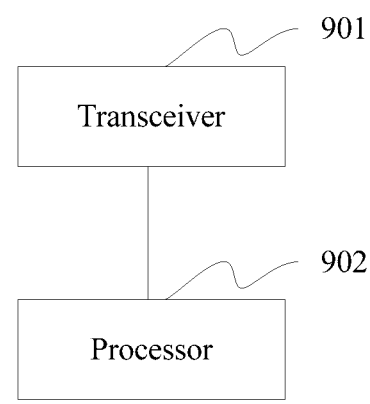
FIG. 9 is a schematic structural diagram of a sending device according to an embodiment of the present invention.

Corresponding to FIG. 3, as shown in FIG. 9, this embodiment of the present invention provides a sending device, and the sending device includes:

a transceiver 901, configured to send unicast data and multicast data to a receiving device in a same subframe, and receive acknowledgement information sent by the receiving device by using a feedback resource; and a processor 902, configured to determine a data receiving status of the receiving device according to the feedback resource by using which the transceiver 901 receives the acknowledgement information, the acknowledgement information received by the transceiver 901, a resource mapping relationship, and an acknowledgement mapping relationship.

The resource mapping relationship is used to indicate a mapping relationship between the feedback resource and the data receiving status, the acknowledgement mapping relationship is used to indicate a mapping relationship between the acknowledgement information and the data receiving status, and the data receiving status includes a receiving status of the unicast data and a receiving status of the multicast data.

Optionally, the resource mapping relationship includes:

a first relationship, where the first relationship is used to indicate that when data of at least one transport block in the unicast data is successfully received, the feedback resource is a unicast feedback resource corresponding to the unicast data; and/or a second relationship, where the second relationship is used to indicate that when data of all transport blocks in the unicast data fails to be received, and data of the multicast data is successfully received or the receiving status of the multicast data is discontinuous transmission DTX, the feedback resource is a unicast feedback resource corresponding to the unicast data.

Optionally, the resource mapping relationship includes:

a third relationship, where the third relationship is used to indicate that when a data receiving status of a transport block in the unicast data does not include successfully received, and data of the multicast data fails to be received, the feedback resource is a multicast feedback resource corresponding to the multicast data.

Optionally, the processor 902 is further configured to:

determine a feedback resource that may be used by the receiving device to send the acknowledgement information, where the feedback resource includes a unicast feedback resource corresponding to the unicast data and a multicast feedback resource corresponding to the multicast data; and the transceiver 901 is further configured to perform monitoring on the feedback resource that is determined by the processor 902 and that may be used by the receiving device to send the acknowledgement information, to receive the acknowledgement information sent by the receiving device.

Optionally, the multicast feedback resource is a multicast physical uplink control channel PUCCH resource, and the multicast PUCCH resource meets the following condition:

$$n_{PUCCH}^{(p0)}=n_{CCE}+N_{PUCCH}^{(1)}+F(n_{RNTI}), \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and $F(n_{RNTI})=n_{RNTI} \bmod L$, where $n_{RNTI}$ represents a radio network temporary identifier, and L represents a CCE aggregation level.

Optionally, the multicast feedback resource is a multicast physical uplink control channel PUCCH resource, and the multicast PUCCH resource meets the following condition:

$$n_{PUCCH}^{(p0)}=n_{CCE}+N_{PUCCH}^{(1)}+k, \text{ where}$$

$n_{PUCCH}$ represents the multicast PUCCH resource, $n_{CCE}$ represents a number of the first control channel element CCE occupied by a multicast PDCCH resource, $N_{PUCCH}^{(1)}$ represents an offset that is of a multicast PUCCH resource region and that is configured by using higher layer signaling, and a value range of k is [0, L−1], where L represents a CCE aggregation level.

Optionally, when the unicast data is unicast physical downlink shared channel PDSCH data, the receiving status of the unicast data includes a data receiving status of each transport block in the unicast PDSCH data.

Optionally, the receiving status of the multicast data is a logical AND operation result of receiving statuses of N pieces of multicast data, and a receiving status of each piece of multicast data is a logical AND operation result of data receiving statuses of all transport blocks in the multicast data.

By using the receiving device and the sending device provided in this embodiment of the present invention, the receiving device can synchronously feed back a receiving status of unicast data and a receiving status of multicast data to the sending device.

Embodiment 5

Figure 10:
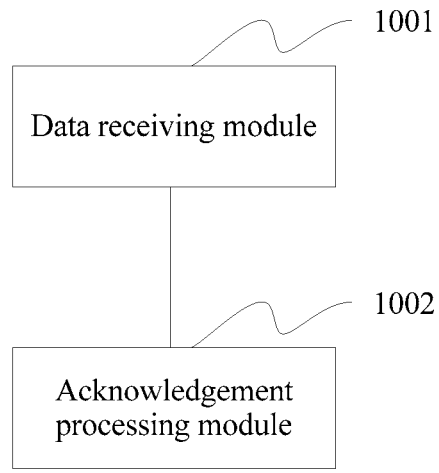
FIG. 10 is a schematic structural diagram of a receiving device according to an embodiment of the present invention.

Corresponding to FIG. 2, as shown in FIG. 10, this embodiment of the present invention provides a receiving device, and receiving device includes:

a data receiving module 1001, configured to receive unicast data and multicast data sent by a sending device in a same subframe; and an acknowledgement processing module 1002, configured to determine, according to a data receiving status of the data receiving module 1001 and a mapping relationship, not to send acknowledgement information to the sending device, to indicate to the sending device that data receiving statuses of all transport blocks in the unicast data are discontinuous transmission DTX, and that data of the multicast data is successfully received or a receiving status of the multicast data is discontinuous transmission DTX.

The data receiving status includes a receiving status of the unicast data and the receiving status of the multicast data, and the mapping relationship is used to indicate a mapping relationship between the data receiving status and an operation that the receiving device does not send acknowledgement information to the sending device.

Optionally, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

Figure 11:
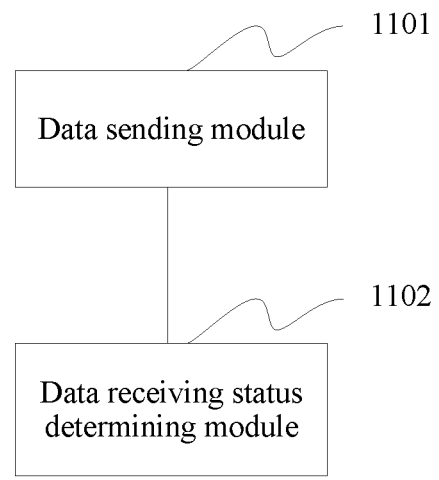
FIG. 11 is a schematic structural diagram of a sending device according to an embodiment of the present invention.

Corresponding to FIG. 4, as shown in FIG. 11, this embodiment of the present invention provides a sending device, and the sending device includes:

a data sending module 1101, configured to send unicast data and multicast data to a receiving device in a same subframe; and a data receiving status determining module 1102, configured to: when no acknowledgement information sent by the receiving device is detected, determine, according to a mapping relationship, that data receiving statuses of all transport blocks in the unicast data are discontinuous transmission DTX, and that data of the multicast data is successfully received or a receiving status of the multicast data is discontinuous transmission DTX.

The mapping relationship is used to indicate a mapping relationship between a data receiving status and an operation that the receiving device does not send acknowledgement information to the sending device, and the data receiving status includes a receiving status of the unicast data and the receiving status of the multicast data.

Optionally, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

Figure 12:
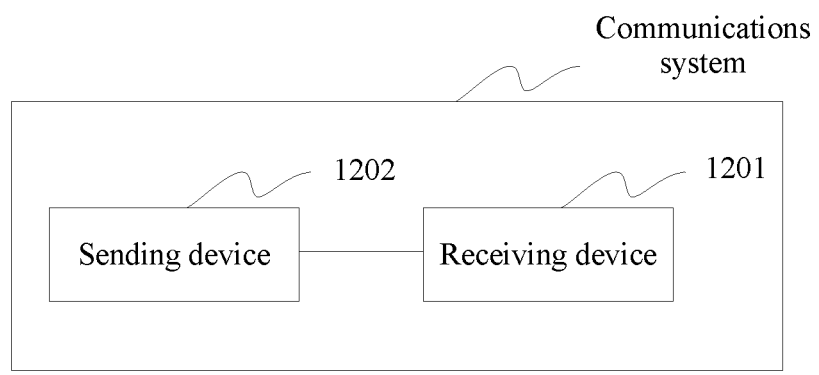
FIG. 12 is a schematic structural diagram of a communications system according to an embodiment of the present invention.

As shown in FIG. 12, this embodiment of the present invention provides a communications system, and the communications system includes a receiving device 1201 and a sending device 1202.

The receiving device 1201 includes the apparatus shown in FIG. 10; and the sending device 1202 includes the apparatus shown in FIG. 11.

By using the receiving device, the sending device, and the communications system provided in this embodiment of the present invention, the receiving device can synchronously feed back a receiving status of unicast data and a receiving status of multicast data to the sending device.

Embodiment 6

Figure 13:
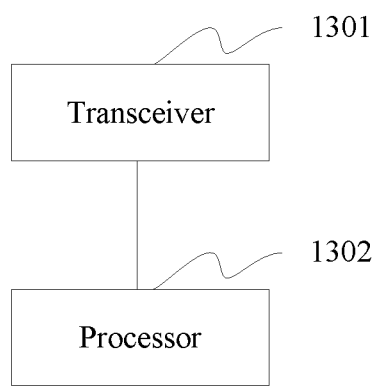
FIG. 13 is a schematic structural diagram of a receiving device according to an embodiment of the present invention.

Corresponding to FIG. 2, as shown in FIG. 13, this embodiment of the present invention provides a receiving device, and the receiving device includes:

a transceiver 1301, configured to receive unicast data and multicast data sent by a sending device in a same subframe; and a processor 1302, configured to determine, according to a data receiving status of the transceiver 1301 and a mapping relationship, not to send acknowledgement information to the sending device, to indicate to the sending device that data receiving statuses of all transport blocks in the unicast data are discontinuous transmission DTX, and that data of the multicast data is successfully received or a receiving status of the multicast data is discontinuous transmission DTX.

The data receiving status includes a receiving status of the unicast data and the receiving status of the multicast data, and the mapping relationship is used to indicate a mapping relationship between the data receiving status and an operation that the receiving device does not send acknowledgement information to the sending device.

Optionally, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

Figure 14:
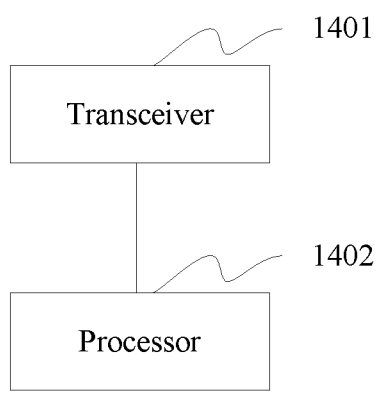
FIG. 14 is a schematic structural diagram of a sending device according to an embodiment of the present invention.

Corresponding to FIG. 4, as shown in FIG. 14, this embodiment of the present invention provides a sending device, and the sending device includes:

a transceiver 1401, configured to send unicast data and multicast data to a receiving device in a same subframe; and a processor 1402, configured to: when no acknowledgement information sent by the receiving device is detected, determine, according to a mapping relationship, that data receiving statuses of all transport blocks in the unicast data are discontinuous transmission DTX, and that data of the multicast data is successfully received or a receiving status of the multicast data is discontinuous transmission DTX.

The mapping relationship is used to indicate a mapping relationship between a data receiving status and an operation that the receiving device does not send acknowledgement information to the sending device, and the data receiving status includes a receiving status of the unicast data and the receiving status of the multicast data.

Optionally, the mapping relationship includes:

when the data receiving statuses of all the transport blocks in the unicast data are discontinuous transmission DTX, and the data of the multicast data is successfully received or the receiving status of the multicast data is discontinuous transmission DTX, the receiving device does not feed back acknowledgement information to the sending device.

By using the receiving device and the sending device provided in this embodiment of the present invention, the receiving device can synchronously feed back a receiving status of unicast data and a receiving status of multicast data to the sending device.

For example, in the foregoing embodiments of the present invention, the receiving device may be user equipment or a terminal, and the sending device may be a base station.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. An acknowledgement information sending method, comprising:

receiving, by a receiving device, unicast data and multicast data sent by a sending device in a same subframe;

determining, by the receiving device, a feedback resource according to a data receiving status and a resource mapping relationship, wherein the data receiving status comprises a receiving status of the unicast data and a receiving status of the multicast data, and wherein the resource mapping relationship indicates a mapping relationship between the data receiving status and the feedback resource; and sending, by the receiving device, acknowledgement information to the sending device by using the determined feedback resource, wherein the acknowledgement information notifies the sending device of the receiving status of the unicast data and the receiving status of the multicast data.

2. The method according to claim 1, further comprising:

determining, by the receiving device, the acknowledgement information according to the data receiving status and an acknowledgement mapping relationship, wherein the acknowledgement mapping relationship indicates a mapping relationship between the data receiving status and the acknowledgement information.

3. The method according to claim 1, wherein the resource mapping relationship comprises at least one of:

a first relationship, wherein the first relationship indicates that when data of at least one transport block in the unicast data is successfully received, the feedback resource is a unicast feedback resource corresponding to the unicast data; and a second relationship, wherein the second relationship is used to indicate that when data of all transport blocks in the unicast data fails to be received, and when data of the multicast data is successfully received or the data receiving status of the multicast data is discontinuous transmission (DTX), the feedback resource is a unicast feedback resource corresponding to the unicast data.

4. The method according to claim 1, wherein the resource mapping relationship comprises:
a third relationship, wherein the third relationship is used to indicate that when a data receiving status of a transport block in the unicast data does not comprise an indication of successful receipt, and when data of the multicast data fails to be received, the feedback resource is a multicast feedback resource corresponding to the multicast data.

5. An acknowledgement information receiving method, comprising:
sending, by a sending device, unicast data and multicast data to a receiving device in a same sub frame;
receiving, by the sending device, acknowledgement information sent by the receiving device by using a feedback resource; and
determining, by the sending device, a data receiving status of the receiving device according to the feedback resource, the acknowledgement information, a resource mapping relationship, and an acknowledgement mapping relationship; and
wherein the resource mapping relationship indicates a mapping relationship between the feedback resource and the data receiving status, wherein the acknowledgement mapping relationship indicates a mapping relationship between the acknowledgement information and the data receiving status, and wherein the data receiving status comprises a receiving status of the unicast data and a receiving status of the multicast data.

6. The method according to claim 5, wherein the resource mapping relationship comprises at least one of:
a first relationship, wherein the first relationship indicates that when data of at least one transport block in the unicast data is successfully received, the feedback resource is a unicast feedback resource corresponding to the unicast data; and
a second relationship, wherein the second relationship indicates that when data of all transport blocks in the unicast data fails to be received, and when data of the multicast data is successfully received or the receiving status of the multicast data is discontinuous transmission (DTX), the feedback resource is a unicast feedback resource corresponding to the unicast data.

7. The method according to claim 5, wherein the resource mapping relationship comprises:
a third relationship, wherein the third relationship indicates that when a data receiving status of a transport block in the unicast data does not comprise an indication of successful receipt, and when data of the multicast data fails to be received, the feedback resource is a multicast feedback resource corresponding to the multicast data.

8. The method according to claim 5, before the receiving, by the sending device, acknowledgement information sent by the receiving device by using the feedback resource, the method further comprising:
determining, by the sending device, a feedback resource that may be used by the receiving device to send the acknowledgement information, wherein the feedback resource comprises a unicast feedback resource corresponding to the unicast data and a multicast feedback resource corresponding to the multicast data; and
performing, by the sending device, monitoring on the feedback resource that may be used by the receiving device to send the acknowledgement information to receive the acknowledgement information sent by the receiving device.

9. A receiving device, comprising:
at least one processor; and
a non-transitory computer readable storage medium storing programming for execution by the at least one processor, the programming including instructions instructing the at least one processor to:
receive unicast data and multicast data sent by a sending device in a same subframe;
determine a feedback resource according to a data receiving status and a resource mapping relationship, wherein the data receiving status comprises a receiving status of the unicast data and a receiving status of the multicast data, and wherein the resource mapping relationship indicates a mapping relationship between the data receiving status and the feedback resource; and
send acknowledgement information to the sending device by using the determined feedback resource, wherein the acknowledgement information notifies the sending device of the receiving status of the unicast data and the receiving status of the multicast data.

10. The receiving device according to claim 9, wherein the programming further includes instructions instructing the at least one processor to:
configured to determine the acknowledgement information according to the data receiving status and an acknowledgement mapping relationship, wherein the acknowledgement mapping relationship is used to indicate a mapping relationship between the data receiving status and the acknowledgement information.

11. The receiving device according to claim 9, wherein the resource mapping relationship comprises at least one of:
a first relationship, wherein the first relationship indicates that when data of at least one transport block in the unicast data is successfully received, the feedback resource is a unicast feedback resource corresponding to the unicast data; and
a second relationship, wherein the second relationship indicates that when data of all transport blocks in the unicast data fails to be received, and when data of the multicast data is successfully received or the receiving status of the multicast data is discontinuous transmission (DTX), the feedback resource is a unicast feedback resource corresponding to the unicast data.

12. The receiving device according to claim 9, wherein the resource mapping relationship comprises:
a third relationship, wherein the third relationship indicates that when a data receiving status of a transport block in the unicast data does not comprise an indication of successful receipt, and when data of the multicast data fails to be received, the feedback resource is a multicast feedback resource corresponding to the multicast data.

13. The receiving device according to claim 12, wherein the multicast feedback resource is a multicast physical uplink control channel (PUCCH) resource, and wherein the multicast PUCCH resource meets the following condition:

$$n_{PUCCH} = n_{CCE} + N_{PUCCH}^{(1)} + F(n_{RNTI}), \text{ wherein}$$

$n_{PUCCH}$ represents the multicast PUCCH resource, $n_{CCE}$ represents a number of the first control channel element (CCE) occupied by a multicast PDCCH resource, $N_{PUCCH}^{(1)}$ represents an offset that is of a multicast PUCCH resource region and that is configured by using higher layer signaling, and $F(n_{RNTI}) = n_{RNTI} \bmod L$, wherein $n_{RNTI}$ represents a radio network temporary identifier, and L represents a CCE aggregation level.

14. The receiving device according to claim 12, wherein the multicast feedback resource is a multicast physical uplink control channel (PUCCH) resource, and wherein the multicast PUCCH resource meets the following condition:

$$n_{PUCCH} = n_{CCE} + N_{PUCCH}^{(1)} + k, \text{ wherein}$$

$n_{PUCCH}$ represents the multicast PUCCH resource, $n_{CCE}$ represents a number of the first control channel element (CCE) occupied by a multicast PDCCH resource, $N_{PUCCH}^{(1)}$ represents an offset that is of a multicast PUCCH resource region and that is configured by using higher layer signaling, and a value range of k is [0, L−1], wherein L represents a CCE aggregation level.

15. The receiving device according to claim 9, wherein when the unicast data is unicast physical downlink shared channel (PDSCH) data, and wherein the receiving status of the unicast data comprises a data receiving status of each transport block in the unicast PDSCH data.

16. The receiving device according to claim 9, wherein the receiving status of the multicast data is a logical AND operation result of receiving statuses of N pieces of multicast data, and wherein a receiving status of each piece of multicast data is a logical AND operation result of data receiving statuses of all transport blocks in the multicast data.

17. A sending device, comprising:
at least one processor; and
a non-transitory computer readable storage medium storing programming for execution by the processor, the programming including instructions instructing the at least one processor to:
send unicast data and multicast data to a receiving device in a same subframe;
receive acknowledgement information sent by the receiving device by using a feedback resource; and
determine a data receiving status of the receiving device according to the feedback resource, the acknowledgement information, a resource mapping relationship, and an acknowledgement mapping relationship; and wherein the resource mapping relationship indicates a mapping relationship between the feedback resource and the data receiving status, wherein the acknowledgement mapping relationship indicates a mapping relationship between the acknowledgement information and the data receiving status, and wherein the data receiving status comprises a receiving status of the unicast data and a receiving status of the multicast data.

18. The sending device according to claim 17, wherein the resource mapping relationship comprises at least one of:

a first relationship, wherein the first relationship indicates that when data of at least one transport block in the unicast data is successfully received, the feedback resource is a unicast feedback resource corresponding to the unicast data; and a second relationship, wherein the second relationship indicates that when data of all transport blocks in the unicast data fails to be received, and when data of the multicast data is successfully received or the receiving status of the multicast data is discontinuous transmission (DTX), the feedback resource is a unicast feedback resource corresponding to the unicast data.

19. The sending device according to claim 17, wherein the resource mapping relationship comprises:

a third relationship, wherein the third relationship indicates that when a data receiving status of a transport block in the unicast data does not comprise successfully received, and when data of the multicast data fails to be received, the feedback resource is a multicast feedback resource corresponding to the multicast data.

20. The sending device according to claim 17, wherein the programming further includes instructions instructing the at least one processor to:

determine a feedback resource that may be used by the receiving device to send the acknowledgement information, wherein the feedback resource comprises a unicast feedback resource corresponding to the unicast data and a multicast feedback resource corresponding to the multicast data; and perform monitoring on the feedback resource that may be used by the receiving device to send the acknowledgement information to receive the acknowledgement information sent by the receiving device.

* * * * *

UNITED STATES PATENT AND TRADEMARK OFFICE
CERTIFICATE OF CORRECTION

PATENT NO. : 10,680,781 B2
APPLICATION NO. : 15/880645
DATED : June 9, 2020
INVENTOR(S) : Chaojun Li and Xiaobo Chen It is certified that error appears in the above-identified patent and that said Letters Patent is hereby corrected as shown below:

In the Claims

In Column 39, Line 20, in Claim 5, delete "sub frame;" and insert -- subframe; --, therefor.

Signed and Sealed this
First Day of December, 2020

Andrei Iancu
*Director of the United States Patent and Trademark Office*